(12) United States Patent
Müller

(10) Patent No.: US 7,276,215 B2
(45) Date of Patent: Oct. 2, 2007

(54) MIXING DEVICE FOR TWO-PHASE CONCURRENT VESSELS

(75) Inventor: Morten Müller, Fredensborg (DK)

(73) Assignee: Morten Muller Ltd. ApS, Fredensborg (DK)

( * ) Notice: Subject to any disclaimer, the term of this patent is extended or adjusted under 35 U.S.C. 154(b) by 537 days.

(21) Appl. No.: 10/705,750

(22) Filed: Nov. 10, 2003

(65) Prior Publication Data

US 2004/0134836 A1     Jul. 15, 2004

Related U.S. Application Data

(60) Provisional application No. 60/425,122, filed on Nov. 8, 2002.

(51) Int. Cl.
*B01J 19/00*     (2006.01)
*B01F 5/06*      (2006.01)

(52) U.S. Cl. .................. 422/224; 422/195; 422/196; 422/211; 261/110; 261/114.1; 261/114.2; 366/340; 366/341

(58) Field of Classification Search ............... 422/195, 422/196, 224, 211; 261/110, 114.1, 114.2; 366/340, 341
See application file for complete search history.

(56) References Cited

U.S. PATENT DOCUMENTS

| | | | |
|---|---|---|---|
| 3,353,924 A | 11/1967 | Riopelle | |
| 3,541,000 A | 11/1970 | Hanson et al. | |
| 3,705,016 A | 11/1972 | Ludwigsen et al. | |
| 3,787,189 A | 1/1974 | Muffat et al. | |
| 3,824,080 A | 7/1974 | Smith et al. | |
| 3,824,081 A | 7/1974 | Smith et al. | |
| 3,977,834 A | 8/1976 | Alcock et al. | |
| 4,233,269 A | 11/1980 | Kaye et al. | |
| 4,836,989 A | 6/1989 | Aly et al. | |
| 5,152,957 A | 10/1992 | Rossetti | |
| 5,232,283 A * | 8/1993 | Goebel et al. | 366/336 |
| 5,403,560 A | 4/1995 | Deshpande | |
| 5,462,719 A | 10/1995 | Pedersen | |
| 5,554,346 A * | 9/1996 | Perry et al. | 422/195 |
| 5,567,396 A * | 10/1996 | Perry et al. | 422/190 |
| 5,690,896 A * | 11/1997 | Stangeland et al. | 422/191 |

(Continued)

FOREIGN PATENT DOCUMENTS

EP     0 716 881 A1     6/1996

(Continued)

*Primary Examiner*—N. Bhat
(74) *Attorney, Agent, or Firm*—Klein, O'Neill & Singh, LLP; Howard J. Klein

(57) ABSTRACT

In a vertical reactor vessel through which vapor and liquid flow concurrently, the fluids pass vertically through a horizontal mixing box having internal flow baffles that form at least one mixing orifice through which the process stream flows at high velocity. In the mixing orifices the liquid is dispersed to obtain a large area for interphase heat and mass transfer. Each mixing orifice is followed by structure that divides the process stream into two lower velocity streams, whereby turbulent flow conditions are generated, and wherein hold-up time is provided to allow for heat and mass transfer. The fluids exit the mixing box through an outlet opening in a bottom wall of the mixing box. An impingement plate is located below this outlet opening to spread the liquid and decrease the velocity of the exiting jet. The outlet stream from the mixer is equilibrated regarding temperature and chemical composition.

39 Claims, 10 Drawing Sheets

U.S. PATENT DOCUMENTS

| | | | |
|---|---|---|---|
| 5,756,055 A * | 5/1998 | Kelly et al. | 422/194 |
| 5,837,208 A | 11/1998 | Grott | |
| 5,904,907 A * | 5/1999 | Shih | 422/211 |
| 5,935,413 A | 8/1999 | Boyd | |
| 5,989,502 A | 11/1999 | Nelson | |
| 6,183,702 B1 | 2/2001 | Nguyen | |
| 6,508,459 B1 * | 1/2003 | Jacobs et al. | 261/114.2 |
| 6,769,672 B2 * | 8/2004 | Muller | 261/114.2 |
| 6,881,387 B1 * | 4/2005 | Jacobs et al. | 422/224 |
| 6,984,365 B2 * | 1/2006 | Nelson et al. | 422/224 |
| 7,018,435 B1 * | 3/2006 | Wentinck | 48/198.8 |

FOREIGN PATENT DOCUMENTS

| | | |
|---|---|---|
| WO | 02/48286 | 6/2002 |

* cited by examiner

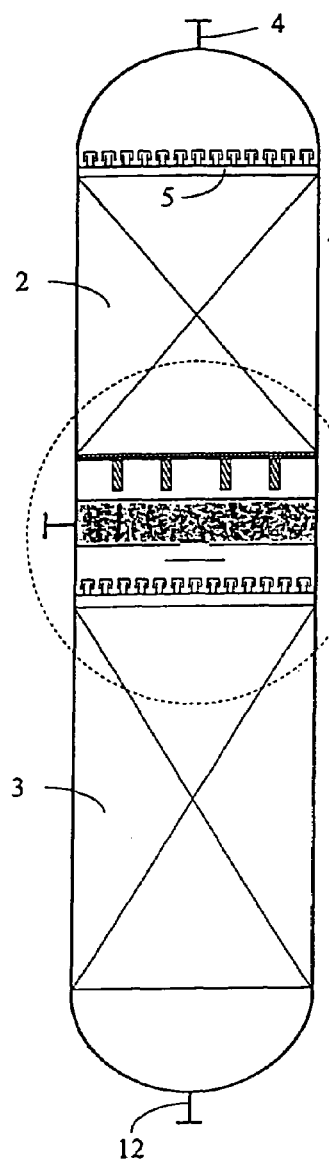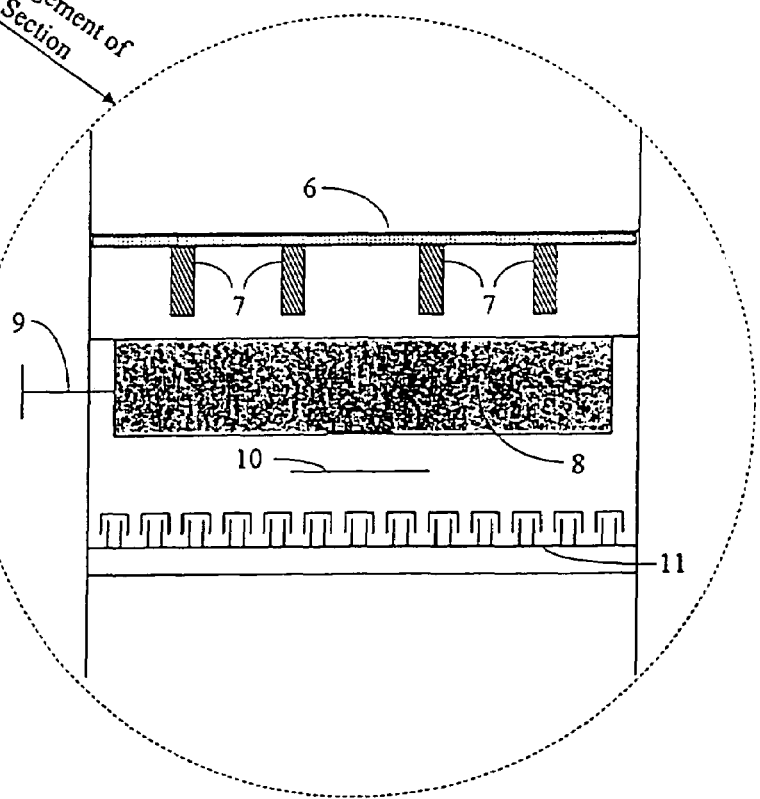
FIG 1A
FIG 1B

MIXING DEVICE FOR TWO-PHASE CONCURRENT VESSELS

CROSS-REFERENCE TO RELATED APPLICATION

This application claims the benefit, under 35 U.S.C. Section 119(e), of co-pending provisional application No. 60/425,122; filed Nov. 8, 2002.

FEDERALLY-SPONSORED RESEARCH OR DEVELOPMENT

Not Applicable

BACKGROUND OF THE INVENTION

1. Field of the Invention

The present invention relates to a mixing device for admixing gas or vapor and liquid in a vessel where a vapor phase and a liquid phase are flowing concurrently. The purpose of the device is to equilibrate the temperature and chemical composition of the outlet mixture exiting the device. The invention is suited for but not limited to the application of admixing hot hydrogen rich treatgas and hot hydrocarbon liquid with a cold quench stream between two adjacent beds of catalyst in a hydroprocessing reactor like a hydrotreating or hydrocracking reactor. The invention furthermore relates to a catalytic reactor comprising a mixing device mentioned above, a method of admixing vapor and liquid in a concurrent flow thereof and a product produced by said method.

2. Related Art

A large number of mixing devices for two-phase concurrent vessels have been described in literature and patents. The majority of these devices belong to one of the six types given below:

Type 1: Vortex Mixers with Inlet Chutes Provided in a Collection Tray

An example of such a design is given in U.S. Pat. No. 3,541,000. The mixer consists of a horizontal collection tray plate 6. The collection tray plate is provided with a plurality of sloped chutes 32/34. The entire process stream of vapor and liquid from the catalyst bed above passes through these inlet chutes at high velocity. Below the collection tray is an annular mixing box 8. The exit jets from the chutes have horizontal components and result in a swirling fluid motion inside the annular mixing box. The fluids are then passing over an internal weir 12 and then vertically downward through a center opening 10. At the outlet of the opening 10 the cold quench fluid is added through perforated distributor pipes in a spider arrangement 30. Below the mixer a distribution tray 14 is located for rough distribution of the liquid. Tray 14 also serves as an impingement plate for the high velocity fluids exiting the opening 10. Below the rough distribution tray a distribution tray 4 is located for final distribution of the liquid.

Other examples of vortex mixers are the following: In U.S. Pat. No. 4,836,989, a mixer similar to the mixer in U.S. Pat. No. 3,541,000 is described. However for improved mixing of the quench fluid, with vapor and liquid from the catalyst bed above, the quench fluid is added through perforated pipe distributors 13 upstream from the collection tray 12 instead of downstream from it. In U.S. Pat. Nos. 5,837,208 and 5,989,502 and in WO 02/48286, mixers similar to the mixer in U.S. Pat. No. 4,836,989 are described.

Type 2: Swirl Box Mixers with Radial/Horizontal Inlet Flow

An example of such a design is given in U.S. Pat. No. 3,353,924. The mixer consists of a collection plate 6. The cold quench media is added through a perforated pipe ring 11 above the collection plate. The vapor and liquid from the catalyst bed 3 above the mixer and the quench fluid enter the swirl box 7 through a plurality of inlet ports 8. Unlike the vortex mixer designs mentioned above, the flow through the inlet ports to the swirl box mixer is mainly in the horizontal/radial direction. The inlet ports are provided with vanes 9 which introduce a swirling motion to the fluids inside the swirl box 7. The fluid exits the swirl box through a center opening 13a. Below the center opening a perforated impingement plate 14 is provided with vertical baffles 16.

Other examples of swirl box mixers are the following: In U.S. Pat. No. 3,787,189 a swirl box mixer similar to the mixer in U.S. Pat. No. 3,353,924 is described. However the inlet openings and vanes of the swirl box have different designs, and the impingement plate 23 below the center opening 20 is not perforated. Vanes 22 introducing a swirling motion to the fluids exiting the mixer below the collection plate 18 have replaced the radial arranged vertical baffles at the mixer outlet. In U.S. Pat. No. 5,462,719 a swirl box mixer similar to the mixer in U.S. Pat. No. 3,353,924 is described. The vapor and liquid are first passed through radial perforations in a cylindrical baffle 24 then through vanes 22, which result in swirling fluid motions inside the swirl box. The fluids exit the swirl box through the central opening 21 and enter a second mixing box located below the collection plate 20. In the second mixing box the fluids flow outward in a radial direction and exit the mixer through the radial perforations in cylindrical wall 26.

Type 3: Bubble Cap Like Mixers

An example of such a design is given in U.S. Pat. No. 5,152,967. The mixer consist of a collection plate 16 and a cap 18, 19 overlaying a downcomer 17. The cap and downcomer define the first mixing swirl chamber. The sidewalls of the cap 19 are provided with angled openings. As the vapor and liquid enter the first swirl chamber through the angled openings, a swirling motion is introduced. The fluids flow first upward and over the upper edge of downcomer 17 and then downward through the downcomer and a central opening in the plate 16. The present mixer is also provided with a second swirl chamber located below the first swirl chamber with inward radial flow.

Other examples of bubble cap like mixers are the following: In U.S. Pat. No. 6,183,702 another bubble cap like mixer is described. The mixer consists of a collection plate 1125, which holds a certain liquid level. The collection plate is provided with vertical baffles 1130 which promote a swirling motion of the liquid on the plate 1125. The swirling motion is further intensified by quench fluid jets exiting from pipes 1140. On the collection tray a bubble cap like mixer consisting of a slotted cylindrical cap 1150 overlaying a cylindrical downcomer 1165 is mounted over a central opening in plate 1125. The annular space between the cap and the downcomer is provided with semi-spiral shaped baffles 1155. The vapor enters the annular space through the slots in the cylindrical wall of cap 1150, whereby the vapor "lifts" the liquid up into the annular space, and the vapor and liquid flow upward through the annular space. A swirling motion is introduced in the annular space by baffles 1155. The vapor and liquid flow down through the downcomer and through the opening in the collection plate 1125. U.S. Pat. Nos. 3,824,080, 3,824,081 and 5,403,560 are other examples of bubble cap like mixers.

Type 4: Mixers with Separate Mixing of Vapor and Liquid

An example of such a design is given in European patent no. 716,881. The mixer consist of a collection plate 20 with a center opening 30. Above the center opening a vapor swirl box 100/55 for mixing the vapors is located. The vapor swirl box is provided with apertures 95 and swirling means 105. The collection plate 20 is provided with other openings 40 for liquid flow. The openings are connected with channels 65 to direct the liquid toward the centerline of the reactor. During normal operation the collection plate 20 holds a certain liquid level, and the vapor enters the vapor swirl box mixer 100/55 and exits through the center opening 30 while the liquid is bypassing the swirl box mixer through the parallel liquid passages 40/65. Below the mixer a rough distributor/impingement plate 90 is located.

Another example of a mixer with separate mixing of vapor and liquid is given in U.S. Pat. No. 5,935,413.

Type 5: Baffled Box Mixer with Vertical Flow

An example of such a design is given in U.S. Pat. No. 4,233,269. The mixer consists of an inlet feed conduit 12 where the vapor and liquid enter the mixer. From the inlet feed conduit, the fluids are passed through two circular mixing orifices formed by doughnut plates 32 and 36 and through one annular flow restriction formed by the disc 34.

Type 6: Baffled Box Mixer with Horizontal Flow

An example of such a design is given in U.S. Pat. No. 5,690,896. The mixer is built as an integral part of the catalyst support system. Vapor and liquid are collected in the annular collecting trough 24. Quench fluid is added to the annular collection trough through quench pipes 22 and 23. The vapor and liquid flow through the annular collection trough to the mixer box 30 located between the support beams 14 and 15. The entire process stream enters the mixer box at the inlet 36. The mixer box consists of a single flow channel with a 360° turn in flow direction. After the 360° turn in the mixer box the fluid exits through the center opening 37.

U.S. Pat. No. 3,705,016 describes a mixer consisting of a screen 11/12 located on a collection and catalyst support plate 8. The screen is covered by inert support material 7. Quench fluid is injected in the catalyst bed above the plate 8. The vapor and liquid can pass through the screen 11/12 while the inert material cannot. After having passed through the screen, the vapor and liquid flow vertically through the center opening in the plate 8. Below the plate 8, a horizontal mixing box, comprising a horizontal bottom plate 16 and vertical baffles 20, 21, 22 and 23, is located. The fluids exiting the center opening are first divided into two horizontal streams. Then each of the two streams is again divided into two streams resulting in a total of four streams. At the mixer exit two of these four streams are recombined and sent to one side of the reactor cross section while the remaining two streams are also recombined and sent to the other side of the reactor cross section. Finally the vapor and liquid are distributed through a perforated tray 25.

Another example of a baffled box mixer with horizontal flow is given in U.S. Pat. No. 3,977,834. A mixer consisting of a plurality of parallel mixing boxes 13 is described. The mixing boxes are located between the catalyst support beams 7 and a quench fluid is added between the beams upstream from the mixer boxes through pipes 11.

DISCUSSION OF PERFORMANCE OF MIXERS OF THE RELATED ART

Pressure drop is the driving force for mixing in all the cited mixer designs. However, for instance in hydrotreating and hydrocracking process units, an increased pressure drop in the mixer results in significant additional costs. Examples of this are the increased initial cost of the recycle gas compressor and increased operating cost in terms of additional shaft power required for the recycle gas compressor. In a two-phase mixer the following criteria for achieving good mixing and an equilibrated outlet mixture for a given mixer pressure drop have been established:

A) The mixer needs to have flow restrictions or mixing orifices with a high flow velocity. The high velocity will disperse the liquid into the vapor or the vapor into the liquid. The dispersed flow results in a large interphase area available for heat and mass transfer. The high velocity also results in a high degree of turbulence, which again results in good mixing. The high velocity further results in high mass transfer and heat transfer coefficients for heat and mass transfer between the liquid and vapor phases.

B) The entire process stream needs to be brought together/contacted in the mixing orifices. It is insufficient to have parallel paths through the mixer since the parallel streams are not contacted and an equilibrated temperature and composition of the parallel streams can therefore not be achieved.

C) The mixer shall have areas with lower flow velocity downstream from the mixing orifices to allow for some hold-up time for the vapor and liquid and to create turbulent flow conditions in the transition from high flow velocity to lower flow velocity. Hold-up time is needed for heat and mass transfer. Turbulent flow conditions are needed to mix the phases.

D) A reasonable distribution or spread of liquid across the reactor cross section must be achieved at the exit of the mixer. Even if a distribution tray is located below the mixer a certain liquid spread over the cross section of the reactor is needed at the mixer exit to prevent excessive liquid level gradients on the distribution tray. For instance a mixer design exiting all liquid at one side of the reactor would not be acceptable.

Further the overall mixer height is important. The mixer shall be as compact as possible to reduce the height requirement of the reactor/vessel. In a hydrotreating or hydrocracking reactor the room taken up by the mixer cannot be utilized for the active catalyst. A given total volume of catalyst is required in order to convert the reactants into the desired products. Therefore the space occupied by the mixer adds to the required reactor size/height. Hydrocracking reactors are designed for operation up to 200 bar and 450° C. with high partial pressures of both hydrogen and hydrogen sulfide. Typically the reactors are designed with internal diameters up to 5 meters. Due to the severe design conditions, the hydrocracking reactor has a thick shell which is typically constructed of 2.25 Cr 1.0 Mo steel with internal lining of austenitic stainless steel such as 347 SS. The cost of one meter of reactor straight side may be as high as one million US dollars (year 2002). Therefore there is a large potential saving if more compact mixer designs are utilized.

The mixers described as "type 1" mixers above (i.e., the vortex mixers with inlet chutes) are the most commonly used mixer designs in commercial hydrotreating and hydrocracking applications today. The major part of the mixer pressure drop is in the inlet chutes. However these chutes represent parallel flow paths. Therefore, the above-mentioned criterion "B" is not fulfilled. Furthermore, the distribution of vapor and liquid to each inlet chute may be poor due to a non-leveled collection plate or due to other fabrication tolerances. Some chutes may pass a major fraction of the liquid, while other chutes are passing the major fraction of the vapor. In such a case, the vapor and liquid are not contacted efficiently in the inlet chutes. The holdup time in the annular box is normally insufficient to allow for one full rotation (360 degrees) of the fluids, so the fluids from different chutes, different sides of the reactor, are never mixed thoroughly. The flow velocity in the inlet chutes is normally too high to allow for liquid separation in the annular box as originally claimed. The entire process stream is contacted in the center opening of the mixer; however the fluids spread all over the reactor cross section immediately after. There is no confined volume to allow for hold up time for heat and mass transfer downstream from the center opening. Therefore, the above-mentioned criterion "C" is not fulfilled either. The type 1 mixers are relatively compact mixers.

For the above-described "type 2" mixers (the swirl box mixers with radial/horizontal inlet flow), the inlet to the swirl chamber takes up a major part of the pressure drop. Again these inlets represent parallel flow paths. Therefore criterion B is not fulfilled. As in the type 1 mixers, the entire process stream is contacted in the center opening. However, the fluids spread all over the reactor cross section immediately after. There is no confined volume to allow for hold up time for heat and mass transfer downstream from the center opening. Therefore, the above-described criterion "C" is not fulfilled either. As in the types 1 and 2 mixers, the above-described "type 3" mixers (the bubble cap like mixers) do not fulfill criteria B and C.

In the above described "type 4" mixers (mixers with separate mixing of vapor and liquid), part of the mixer pressure drop is in premixers to premix the vapor and liquid separately and in parallel. Each single phase premixer in itself also consists of parallel flow paths like parallel inlet chutes or vanes. The mixers, therefore, do not fulfill criterion B. In European patent 716,881, no two-phase mixing orifice is present at all, so criterion A is not fulfilled here either.

The mixers described above as "type 5" (baffled box mixer with vertical flow), as exemplified in U.S. Pat. No. 4,223,269, represent an excellent design regarding mixing performance and fulfill all the criteria A through D given above. However, the type 5 mixers result in very large mixer heights and thus take up a significant volume of the reactor/vessel.

The above-described "type 6" mixers (baffled box mixer with horizontal flow), as exemplified in U.S. Pat. No. 3,705,016 and U.S. Pat. No. 3,977,834, represent mixer designs with more parallel fluid paths and do thus not fulfill criterion B. The mixer described in U.S. Pat. No. 3,977,834 does not fulfill criterion A either, since the entire process stream is never contacted in one mixing orifice. In addition, the mixer described in U.S. Pat. No. 3,705,016 does not fulfill criterion D, since the liquid exits the mixer in an uneven pattern. The type 6 mixer of U.S. Pat. No. 5,690,896 is a reasonable good mixer, but it does not fulfill criterion C. After having brought the entire process stream together in the mixing orifice, there is not sufficient hold up time downstream of the orifice for heat and mass transfer. Also criterion D is not fulfilled, since the fluids approach the center orifice from one side only. The resulting liquid spread at the mixer exit is uneven.

SUMMARY OF THE INVENTION

The invention is a mixing device for admixing gas or vapor and liquid in a vessel with concurrent flow of vapor and liquid. The invention belongs to the mixer type 6, baffled box mixer with horizontal flow, as defined above.

One of the main objects of the invention is to provide for such mixing with a relatively small loss of reactor volume and with relatively low energy requirements.

According to the invention, this and other objects and advantages are obtained by providing a mixing device for use in a catalytic reactor and arranged between an upper catalyst bed and a lower catalyst bed thereof for admixing gas or vapor and liquid flowing concurrently inside the vessel of said reactor through said mutually superimposed catalyst beds, said mixing device being adapted for defining a flow path through said mixing device for said vapor and liquid flowing from said upper catalyst bed to said lower catalyst bed or vice versa, said flow path comprising, in a preferred embodiment:

at least one inlet aperture of said mixing device,
at least one outlet aperture of said mixing device,
a first and at least one second mixing orifice or passage arranged sequentially along said flow path, said first and said at least one second mixing orifice being arranged and adapted such that substantially the entire combined flow of liquid and vapor is constrained to flow through each of said mixing orifices having such a flow-through area relative to the flow rate of said combined flow that the no-slip two-phase flow velocity of said combined flow in the mixing orifice is between 3 m/s and 15 m/s, preferably sufficient for the liquid to be dispersed into the vapor and/or the vapor to be dispersed into the liquid, and
an essentially horizontal flow path section extending between said at least one inlet aperture and said at least one outlet aperture such that the vertical dimension of the mixing device is as small as possible, said essentially horizontal flow path section preferably extending from proximate said inlet aperture to proximate said outlet aperture.

Hereby, effective interaction between the liquid and vapor is obtained with a minimum of loss of reactor volume.

The invention provides for a mixing device for use in a catalytic reactor and arranged between an upper catalyst bed and a lower catalyst bed thereof for admixing gas or vapor and liquid flowing concurrently inside the substantially vertical vessel of said reactor through said mutually superimposed catalyst beds, said mixing device being adapted for defining a flow path through said mixing device for said vapor and liquid flowing from said upper catalyst bed to said lower catalyst bed or vice versa, said mixing device, in a preferred embodiment, comprising:

a top wall provided with at least one inlet aperture,
a bottom wall provided with at least one outlet aperture,
a lateral wall extending between the periphery of said top wall and the periphery of said bottom wall for defining an enclosed space between said top and bottom walls,
interior partition walls extending between said top and bottom walls adapted for defining said flow path together with said top and bottom walls, said partition walls furthermore being adapted for defining a first and at least one second mixing orifice or passage arranged sequentially along said flow path, said first and said at least one second mixing orifice being arranged and adapted such that substantially the entire combined flow of liquid and vapor is constrained to flow through each of said mixing orifices having such a flow-through area relative to the flow rate of said combined flow that the no-slip two-phase flow velocity of said combined flow in the mixing orifice is between 3 m/s and 15 m/s, preferably sufficient for the liquid to be dispersed into the vapor and/or the vapor to be dispersed into the liquid, and said interior partition walls together with said top and bottom walls defining an essentially horizontal flow path section extending between said at least one inlet aperture and said at least one outlet aperture such that the vertical dimension of the mixing device is as small as possible, said essentially horizontal flow path section preferably extending from proximate said inlet aperture to proximate said outlet aperture.

The invention, in one embodiment, is a flow-obstructing horizontal mixing box located between the walls of a cylindrical reactor. The mixing box has one or more openings for essentially vertical fluid flow into the mixer. The mixing box comprises a horizontal circular top wall, a horizontal circular bottom wall and a vertical cylindrical wall, which may be a section of the inner wall of the reactor. In order to minimize the height of the mixing box the diameter of the mixing box is preferably close to or identical to the inner diameter of the reactor. Inside the horizontal mixing box vertical flow baffles are provided. The vertical flow baffles form mixing orifices where the entire process stream is flowing through at high flow velocity. The mixing orifice is followed by a "tee", dividing the process stream into two side streams with lower flow velocity. The horizontal mixing box consist of a series of these mixing orifices followed by tee's, meaning that the fluids are first combined at high flow velocity in a first flow restriction then split into two streams of lower velocity by a first tee, then recombined at high velocity in a second flow restriction etc. In the mixing orifices the liquid is dispersed in the vapor to provide a large interphase area for heat and mass transfer. The high flow velocity in the mixing orifices also results in high heat and mass transfer coefficients and in turbulent conditions, which provides mixing. Criterion A is therefore fulfilled. Since the entire process stream is passed through each mixing orifice, Criterion B is also fulfilled. In the area with lower flow velocity between two mixing orifices, hold-up time is provided for the heat and mass transfer to take place. Criterion C is therefore also fulfilled. After having passed through the series of mixing orifices and tee's, the fluids exit in a vertical direction through one or more openings in the circular horizontal bottom wall. Preferably there is one opening at the reactor center line with symmetric fluid approach to the opening to provide an even liquid spread below the mixer. Criterion D is therefore also fulfilled. Below the opening in the circular horizontal bottom wall an impingement plate is located to break down the high velocity of the two-phase jet and to spread the liquid over the cross section of the reactor. Quench fluid may be added upstream from the first mixing orifice either above the horizontal top wall or between the horizontal top and bottom walls. Quench fluid may also be added between two mixing orifices.

While the existing type 6 mixers do not fulfill all of the criteria for proper mixing performance A through D, the present invention does. Compared to the prior art, the invention has improved mixing performance in terms of achieving an outlet stream from the mixer which has been equilibrated regarding temperature and composition. Further, unlike most mixers described in the prior art, the invention utilizes most of the reactor cross section for the mixing box. The large diameter of the mixing box has helped reducing the height requirement of the invention compared to the present art. In Graph 1 the calculated height of the present invention is compared with the calculated height of the vortex mixer of U.S. Pat. No. 4,836,989 for twelve commercial hydroprocessing applications. Both mixers have been designed for the same total pressure drop for each of the twelve commercial applications. As seen the height reduction achievable if the present invention is applied instead of the vortex mixer is 35 mm to 440 mm or 15% to 55%. This is the achievable height reduction of the mixer itself. In addition, if quench fluid is injected, then the quench fluid distributor may be build as an integral part of the present invention, while a separate quench distributor located above the mixer is required for the vortex mixer. See U.S. Pat. No. 4,836,989. The separate quench fluid distributor takes up some additional height.

Graph 1:  The height of the present invention compared to the height of the vortex mixer (US Pat. 4,836,989).
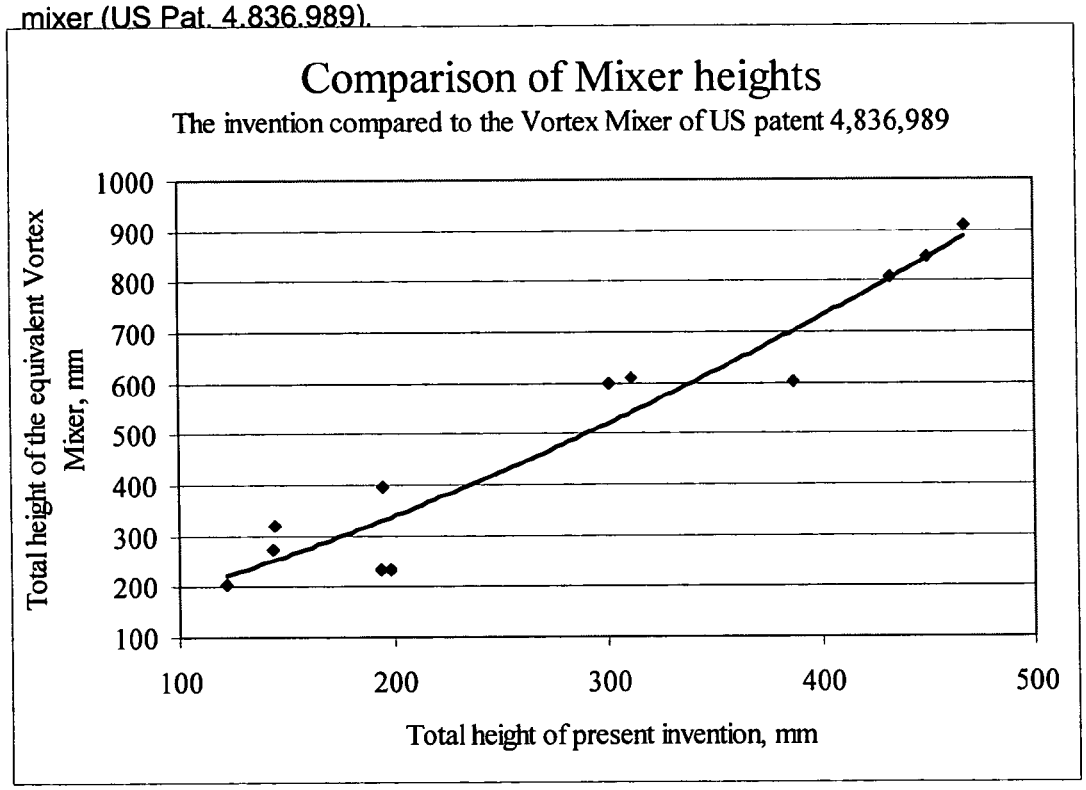

BRIEF DESCRIPTION OF THE DRAWINGS

FIG. 1A is a schematic sketch showing a typical layout of catalyst and internals in a hydroprocessing reactor with two beds of solid catalyst particles, further showing the typical location of the mixing device between two adjacent catalyst beds inside the reactor.

FIG. 1B is an enlarged view of the portion of the device shown within the dashed circle B of FIG. 1A

Figure 2:
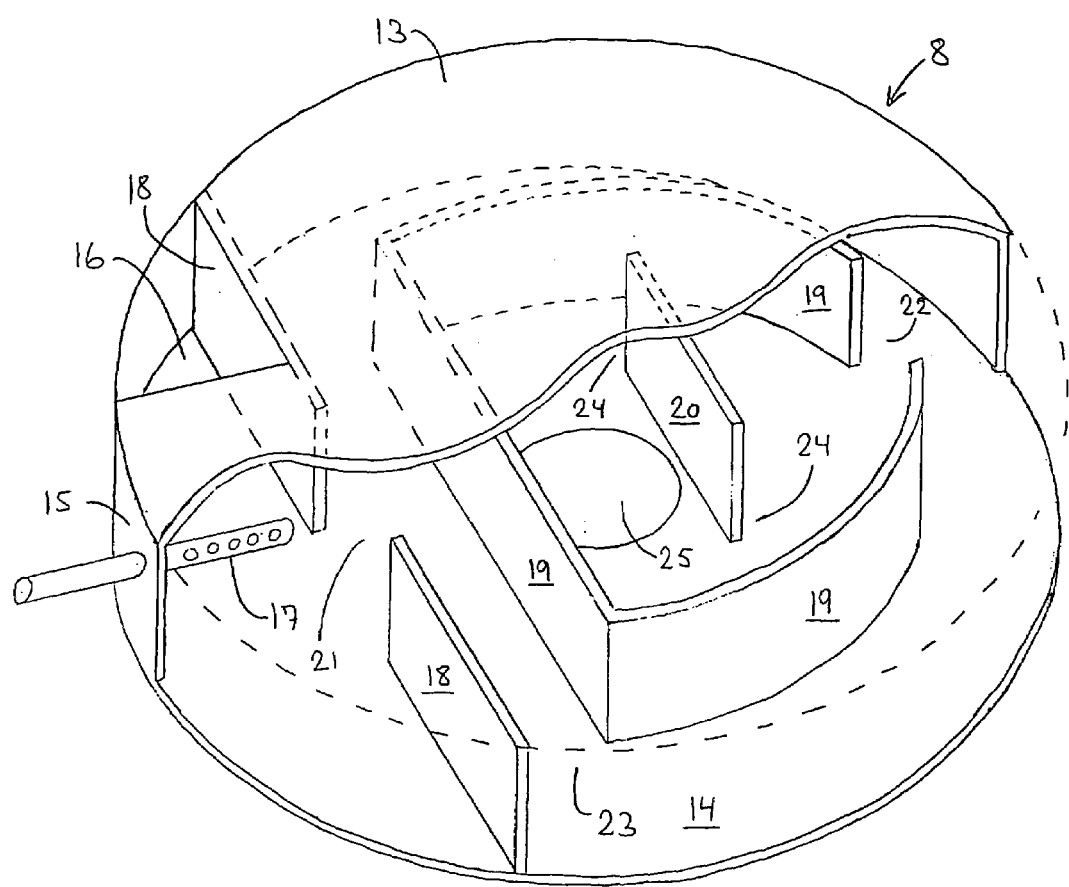
FIG. 2 is a schematic perspective isometric cut-away view of one embodiment of the mixing device according to the present invention.

Alternative embodiments of the present invention include but are not limited to the designs shown in the figures.

DETAILED DESCRIPTION

The reactions taking place in hydroprocessing reactors are exothermic. Heat is therefore released during reaction and causes the temperature to rise when the reactants are converted to products in the presence of a hydroprocessing catalyst at elevated temperature and pressure.

In commercial hydroprocessing reactors, the two-phase mixture of reactants flows through a bed of solid catalyst particles. The ideal flow pattern in such a reactor is plug flow where liquid is flowing downward with the same velocity (based on an empty reactor) at all points of the reactor cross-section. In the ideal plug flow case, the same is true for the vapor phase: The vapor flows downward with identical velocity (based on an empty reactor) at all points of the reactor cross-section.

In commercial reactors, perfect plug flow is never achieved due to non-ideal distribution trays, uneven catalyst loading, and/or the presence of deposits in the void spaces between the catalyst particles. Therefore, in some areas of the catalyst bed, the liquid flow velocity is higher than average and the vapor flow velocity is lower than average. Due to the high heat capacity of the liquid relative to the vapor, the temperature rise in ° C. per meter of flow path is low in these areas. Similarly in other areas of the catalyst bed, the liquid flow velocity is lower than average and the vapor flow velocity is higher than average. Again due to the high heat capacity of the liquid relative to the vapor, the temperature rise in ° C. per meter of flow path is high in these areas.

As a result, even though the reactant mixture has a uniform temperature at the reactor inlet, some areas of the catalyst bed get hotter than others as the fluids are passing through the bed. Further, since the rate of reaction is increasing with increasing temperature, this effect tends to accelerate: The hot areas of the catalyst bed have high rates of reaction, and even more heat is therefore released in these areas than in the cold areas.

Due to the difference in rate of reaction between the hot areas and cold areas of the catalyst bed, differences in the chemical composition of the fluids are also developed.

The non-uniformity in temperature and chemical composition in a horizontal plane has several negative effects:

All hydroprocessing catalysts deactivate during operation. In order to compensate for the decline in activity of the catalyst, the average bed temperature is increased during the run. At some point in time, at end-of-run, the peak temperature in the catalyst bed reaches its maximum allowable value. At this point the entire process unit needs to be shut down, and the catalyst must be regenerated or replaced. Now if there is non-uniformity in temperature in the horizontal plane, the end-of-run will occur at an earlier stage and at a lower average bed temperature. The higher frequency of shut-downs caused by non-uniform temperatures has a high cost to the refiner in terms of lost production, catalyst consumption and additional labor.

Another effect of the non-uniformities is that the degree of chemical conversion is uneven. A fraction of the reactants will be converted to a high extent, while the remaining fraction of the reactants is converted to a lower extent. The result is often lower overall product quality. A first example is a diesel hydrotreating reactor where sulfur-containing hydrocarbon components and $H_2$ are converted to sulfur-free hydrocarbon components and $H_2S$. If non-uniform temperatures exist, then a fraction of the feed oil is reacted at higher temperature and maybe also at lower space velocity due to lower liquid velocity as discussed above. Another fraction of the feed oil is reacted at lower temperature and maybe also higher space velocity due to higher liquid velocity. The result is that the organic sulfur tends to "by-pass" the catalyst bed through the areas with low temperature and high space velocity. This by-pass significantly increases the content of organic sulfur in the overall product. In order to meet the product specification on organic sulfur content, the refiner needs to reduce the feed rate or increase the reactor operating temperature to compensate for the non-uniform temperatures and composition. Reducing the feed rate has a significant cost in terms of lost production. Increasing the reactor temperature results in increased energy consumption and reduced run length with increased frequency of shut-downs for catalyst generation/replacement. The increased frequency of shutdowns has significant costs as discussed above.

A second example is a hydrocracking reactor where heavier hydrocarbon components and $H_2$ are converted to lighter hydrocarbon components. Again if non-uniform temperatures exist then a fraction of the feed oil is reacted at higher temperature and maybe also at lower space velocity due to lower liquid velocity. Another fraction of the feed oil is reacted at lower temperature and maybe also higher space velocity due to higher liquid velocity. The result is that part of the heavy feed oil is "overcracked" so that the production of unwanted $C_1$-$C_4$ gases and light naphtha components is significantly increased while another part of the heavy feed oil is only converted to a low extent. The selectivity of the hydrocracking unit towards the desired product is thus reduced and the overall conversion of the heavy feed components to lighter product components is also reduced. Both effects are associated with significant costs to the refiner.

Non-uniformities in temperature and chemical composition in the horizontal plane of a catalyst bed are unavoidable in commercial hydroprocessing reactors. However the non-uniformities can be minimized by installing suitable reactor internals.

For the first catalyst bed, which the feed/reactants first enters, a good inlet distributor needs to be provided to ensure equal distribution of the liquid and vapor over the cross section of the reactor. The fluids entering this distributor need to be properly mixed upstream from the distributor to ensure that compositional and thermal equilibrium has been achieved. Sufficient mixing of the fluids is most often provided in the piping routing the reactants to the reactor.

For any subsequent catalyst bed(s) a good inlet distributor is also needed to ensure uniform distribution of the liquid and vapor over the cross section of the reactor. However the inlet stream to a subsequent catalyst bed is the outlet stream from an upstream catalyst bed where a non-uniform temperature and chemical composition will exist at the bed outlet. Therefore it is essential to have a mixing device located between the upstream catalyst bed and the distributor. Otherwise the non-uniformity in temperature and chemical composition may proceed from one bed to the next and worsen. The purpose of the mixing device is to produce an outlet stream, which is equilibrated regarding temperature and composition.

A quench fluid, which is colder than the fluids inside the reactor, is often injected into the hydroprocessing reactor between two adjacent catalyst beds in order to cool down the hot effluent from one catalyst bed before the fluids enter the next bed. This allows for operation of the reactor closer to isothermal conditions, which has several benefits in terms of increased run length and improved product quality. A further objective of the mixing device in this case is to mix the cold quench stream with the effluent from one catalyst bed to achieve thermal and compositional equilibrium before the stream enters the next catalyst bed.

Referring now to the drawings, FIGS. 1A and 1B show a typical hydroprocessing reactor 1 with a first catalyst particle bed 2 and a second catalyst particle bed 3. FIGS. 1A and 1B are intended to define the typical location of the mixing device relative to the catalyst beds and to other reactor internals. The reactants enter the reactor through an inlet nozzle 4. The fluids now enter the top distribution tray 5, which distributes the vapor and liquid evenly over the cross section of the reactor before the fluids enter first catalyst bed 2. The first catalyst bed 2 rests on a screen or catalyst support grid 6. Large forces are normally acting on the catalyst screen or support grid due to the large weight of the catalyst and due to the forces introduced by the fluid flow through the first catalyst bed 2. Therefore, support beams 7 are normally required to absorb these forces. Below the catalyst support system comprising the grid 6 and the beams 7, a mixing device 8 is located. Quench fluid may be added through a quench nozzle 9. Below the mixer 8, an impingement device 10, for spreading the liquid and for breaking down the high velocity of the jet exiting the mixing device, may be located. Below the mixer 8 a second distribution tray 11 is located which distributes the vapor and liquid evenly over the cross section of the reactor before the fluids enter the second catalyst bed 3. The product from the reactor exits through the outlet nozzle 12.

More than two catalyst beds may also be used. The number of mixing devices 8 is typically N−1 where N is the number of catalyst beds in the reactor.

FIGS. 2 through 9 represent alternative structures of the mixing device according to the present invention. The figures are presented only to characterize the invention and alternatives. They are not intended to limit the scope of the concepts disclosed herein or to serve as working drawings. They should not be construed as setting limits on the scope of the inventive concept. The relative dimensions shown by the drawings should not be considered equal or proportional to commercial embodiments.

FIG. 2 is a schematic perspective isometric cut-away view of a mixing box 8 consisting of a circular top plate 13, a circular bottom plate 14 and a cylindrical side wall 15. The cylindrical side wall 15 may be a section of the inner reactor wall or it may be a separate wall with smaller diameter than the reactor. Preferable the diameter of the cylindrical wall 15 is close to the reactor diameter in order to minimize the height of the mixer. The mixing box forms an essentially leak-tight flow obstruction inside the reactor 1 except from openings 16 in the top plate 13. In the case where the diameter of the cylindrical wall is smaller than the inner diameter of the reactor, a tray plate or other means (not shown) will have to be used to ensure an essentially leak-tight seal between the mixing box 8 and the inner walls of the reactor 1.

Quench fluid is injected into the mixing box 8 through a perforated quench distributor 17. First, second and third flow baffles 18, 19 and 20, respectively, are installed inside the mixing box 8 to form a series of first and second mixing orifices 21, 22, respectively, with high velocity and combined flow; and a pair of outer flow channels 23 and inner flow channels 24, with lower velocity and divided flow. The flow baffles form an essentially leak-tight installation except from the openings 21, 22, 23, and 24 and thus force fluid to flow through these openings only. A circular outlet opening 25 concentric with the reactor centerline is provided in the bottom plate 14. This circular opening serves as the third and final mixing orifice in the mixer.

Figure 3A:
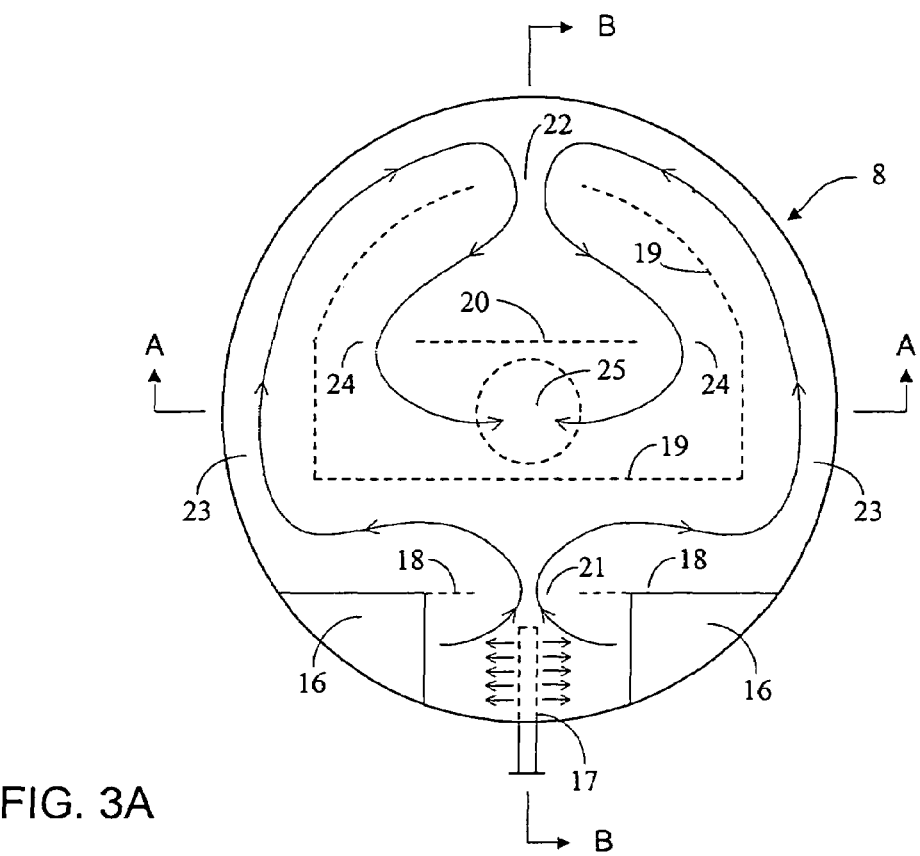
FIG. 3A is an overhead view of the embodiment of the mixing device of FIG. 2.
Figure 3B:
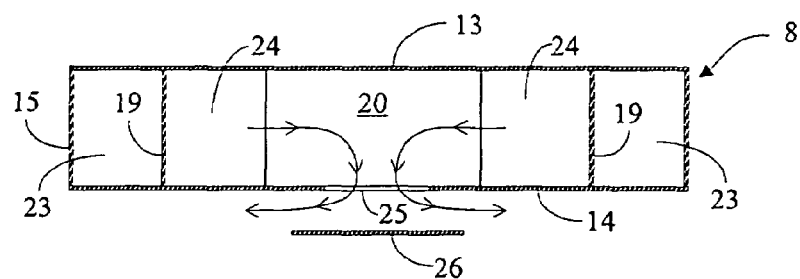
FIG. 3B is a side sectional view taken along the line A-A of FIG. 3A.
Figure 3C:
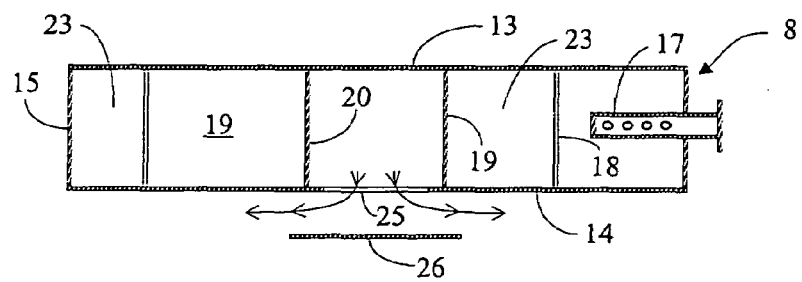
FIG. 3C is a side sectional view taken along the line B-B of FIG. 3A.

FIG. 3A is an overhead view of the mixer from FIG. 2. FIG. 3B is a sectional view along line A-A of FIG. 3A. FIG. 3C is a sectional view along line B-B of FIG. 3A. FIGS. 3A and 3B show a circular impingement plate 26 that is concentric with and located below the circular opening 25.

The intended flow through the device is indicated with arrows in FIGS. 3A, 3B, and 3C. During operation, the vapor and liquid exiting the catalyst bed 2 will flow through the openings 16 and into the mixing box 8. Cold quench fluid is added through distributor 17. The entire process stream is now passed through the first mixing orifice 21 where the flow velocity is high and where the liquid is dispersed into the vapor. Hereafter the stream is divided into two streams with lower velocity by the second flow baffle 19. The two streams now flow in the two symmetrical outer flow channels 23 to the next (second) mixing orifice 22 where the stream is again recombined at high flow velocity. After the second mixing orifice 22, the stream is again divided into two streams with lower velocity by the third flow baffle 20 and the two streams now flow through the two symmetric inner openings/channels 24 to the center opening 25 where the stream is recombined at high flow velocity in this third and last mixing orifice. Finally the impingement plate 26 will ensure that the fluids exit the mixer in an outward radial direction. The impingement plate 26 prevents the mixer from sending a high velocity jet directly toward the distributor tray 11. Such a jet may disturb the liquid level on the distribution tray and it may entrain the liquid. The impingement plate 26 will further ensure a good spread of the liquid across the cross section of the reactor before the fluids enters the distribution tray 11.

Due to the relatively high flow velocities inside the mixing box 8, the gravitational forces are negligible compared to the viscous forces between the vapor and the liquid phases. Therefore any significant phase separation does not occur inside the mixing box 8 even though the mixing box is close to horizontal.

The flow baffles in the mixing box can have many different shapes. They can be straight, curved, angled, etc. Also the baffles do not need to be strictly vertical; it is sufficient that the baffles have a vertical component. The inlet and outlet openings 16 and 25 may also have different shapes such as semi segmental as shown in FIGS. 2 and 3, ellipsoidal, circular, rectangular, triangular etc. The number of inlet openings and outlet openings respectively, may vary from one and upward. The cross section of the mixing box itself can have any shape. It can be a circle, as for the mixer in FIGS. 2, 3A, 3B, and 3C, and it can also be a triangle, rectangle or polygon. A circle or a polygon with many sides is preferred, since the mixing box in this case can be designed with a cross-sectional area which is close to the inside cross-sectional area of the vessel.

Figure 4A:
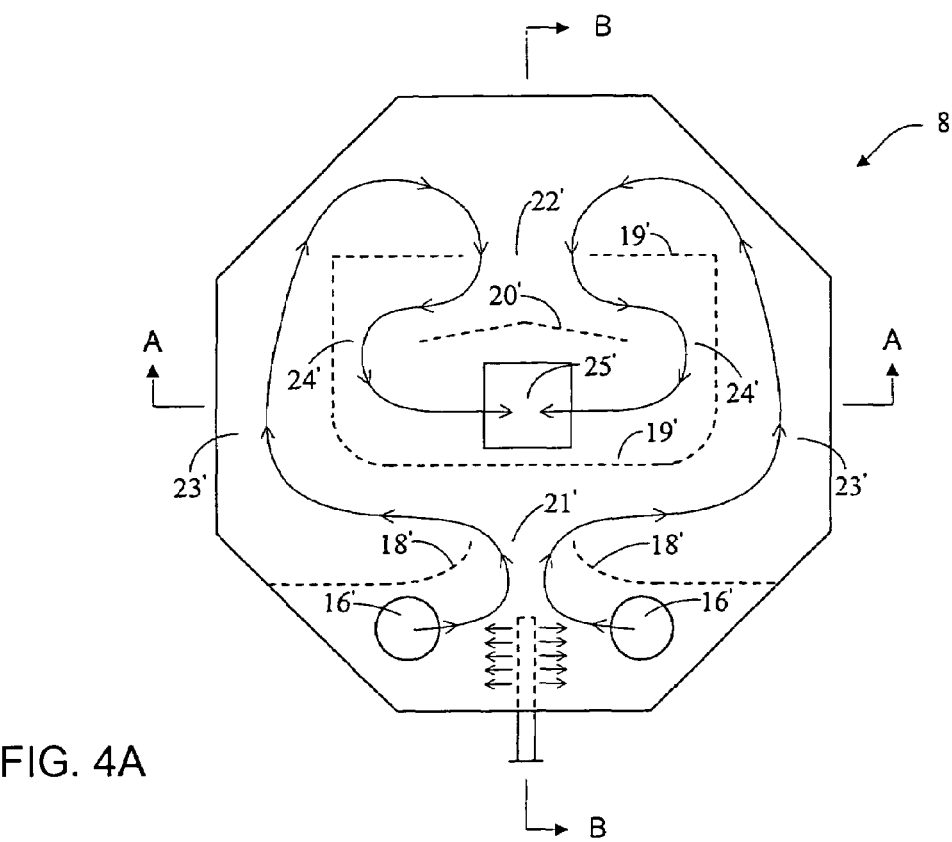
FIGS. 4A, 5A, 6A, 7A, 8A, 9A and 10A are overhead views of alternative embodiments of the present invention.
Figure 4B:
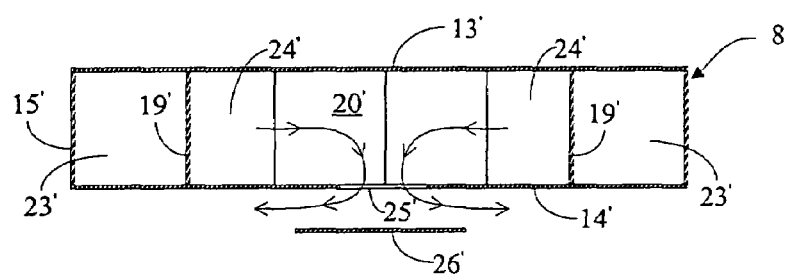
FIGS. 4B, 5B, 6B, 7B, 8B, 9B and 10B are the corresponding side sectional views taken along the lines A-A of FIGS. 4A, 5A, 6A, 7A, 8A, 9A, and 10A, respectively.
Figure 4C:
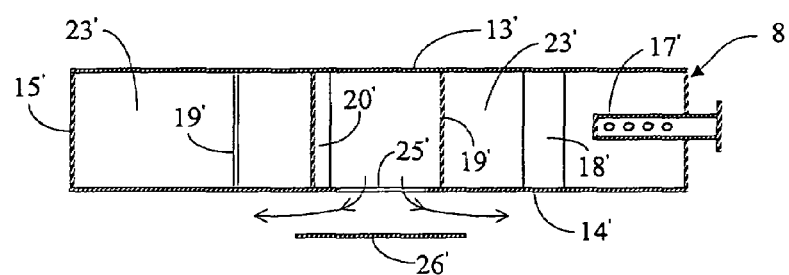
FIGS. 4C, 5C, 6C, 7C, 8C, 9C and 10C are the corresponding side sectional views taken along the lines B-B of FIGS. 4A, 5A, 6A, 7A, 8A, 9A, and 10A, respectively.

An example of an alternative mixer design is given in FIGS. 4A, 4B, and 4C. The flow path through the mixer is indicated by arrows. FIG. 4A is an overhead view of an alternative mixing box 8. FIG. 4B is a sectional view along line A-A in FIG. 4A. FIG. 4C is a sectional view along line B-B in FIG. 4A. The mixing box comprises a top wall 13' and a bottom wall 14' both with the shape of a polygon with eight sides, and a side wall 15'. The top wall 13' is provided with two circular openings 16' for fluid flow to the mixing box 8. Quench fluid is added downstream from the openings 16' and between the top and bottom plates 13' and 14' through a perforated quench fluid distributor 17'. Inside the mixing box, curved first flow baffles 18' are located forming a first mixing orifice 21'. A second flow baffle 19' is located in the mixing box to first divide the stream from the first mixing orifice 21' into two outer channels 23' and later to recombine the two streams into one stream in a second mixing orifice 22'. The corners of the second flow baffle 19' closer to the first mixing orifice 21' are curved, while the corners of the second flow baffle 19' closer to the second mixing orifice 22' are angled. Downstream from the second mixing orifice 22' an angled third flow baffle 20' is located. The third flow baffle 20' divides the stream from the second mixing orifice 22' into two inner flow channels 24' before the entire stream is recombined in a third and last mixing orifice which is a square outlet opening 25'. Below the outlet opening 25' an impingement plate 26' is located.

Figure 5A:
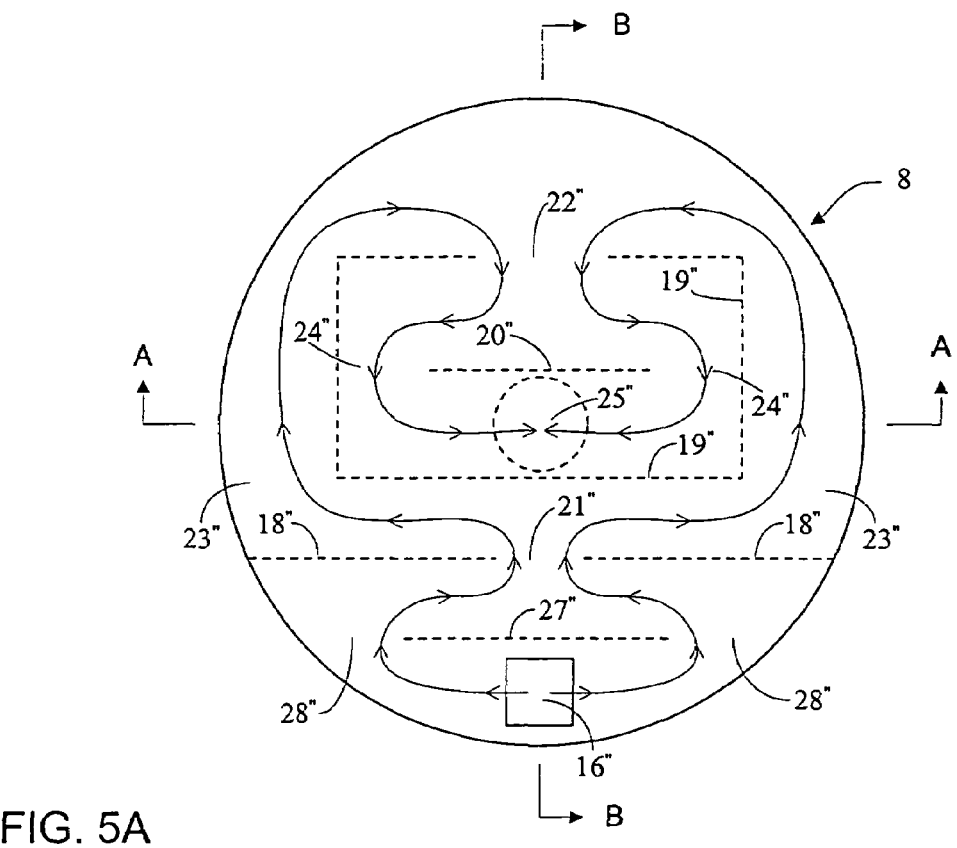
Figure 5B:
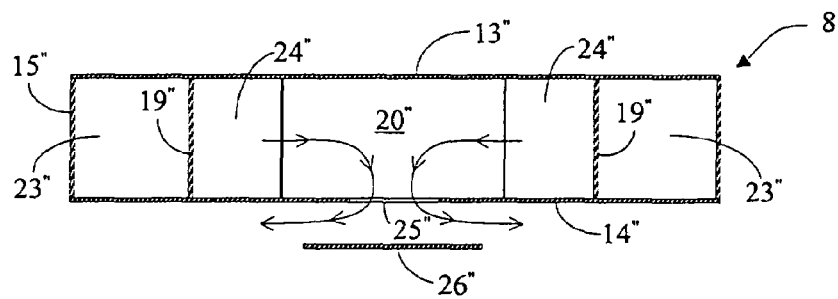
Figure 5C:
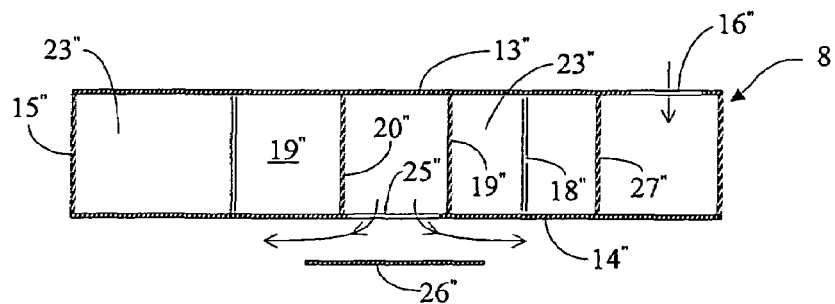

The mixers of FIGS. 2, 3A, 3B, 3C, 4A, 4B, and 4C have three mixing orifices 21, 22 and 25 (or 21', 22' and 25'). The mixing device can, however, be constructed with two or more mixing orifices. FIGS. 5A, 5B, and 5C represents an example of a mixing box 8 with four mixing orifices. The flow path through the mixer is indicated by arrows. FIG. 5A is an overhead view of the mixing box 8. FIG. 5B is a sectional view along line A-A in FIG. 5A. FIG. 5C is a sectional view along line B-B in FIG. 5A. The mixing box comprises a circular top wall 13", a circular bottom wall 14" and a cylindrical side wall 15". The top wall is provided with one rectangular opening 16", which serves as passageway for fluid flow to the mixing box 8 and as a first mixing orifice. Quench fluid is not added in the mixing box 8 but may be added upstream from the mixing orifice 16". Inside the mixing box, a first flow baffle 27" is located to divide the stream from the first mixing orifice 16" into two first flow channels 28". Second flow baffles 18" are located in the mixing box to form a second mixing orifice 21" where the entire process stream is recombined. A third flow baffle 19" is located in the mixing box to first divide the stream from mixing second orifice 21" into two second flow channels 23" and later to recombine the two streams into one stream in a third mixing orifice 22". Downstream from the third mixing orifice 22" a fourth flow baffle 20" is located. The fourth flow baffle 20" divides the stream from the third mixing orifice 22" into two fourth flow channels 24" before the entire stream is recombined in a fourth and last circular mixing orifice 25". Below the fourth mixing orifice 25" a circular impingement plate 26" is located.

Figure 6A:
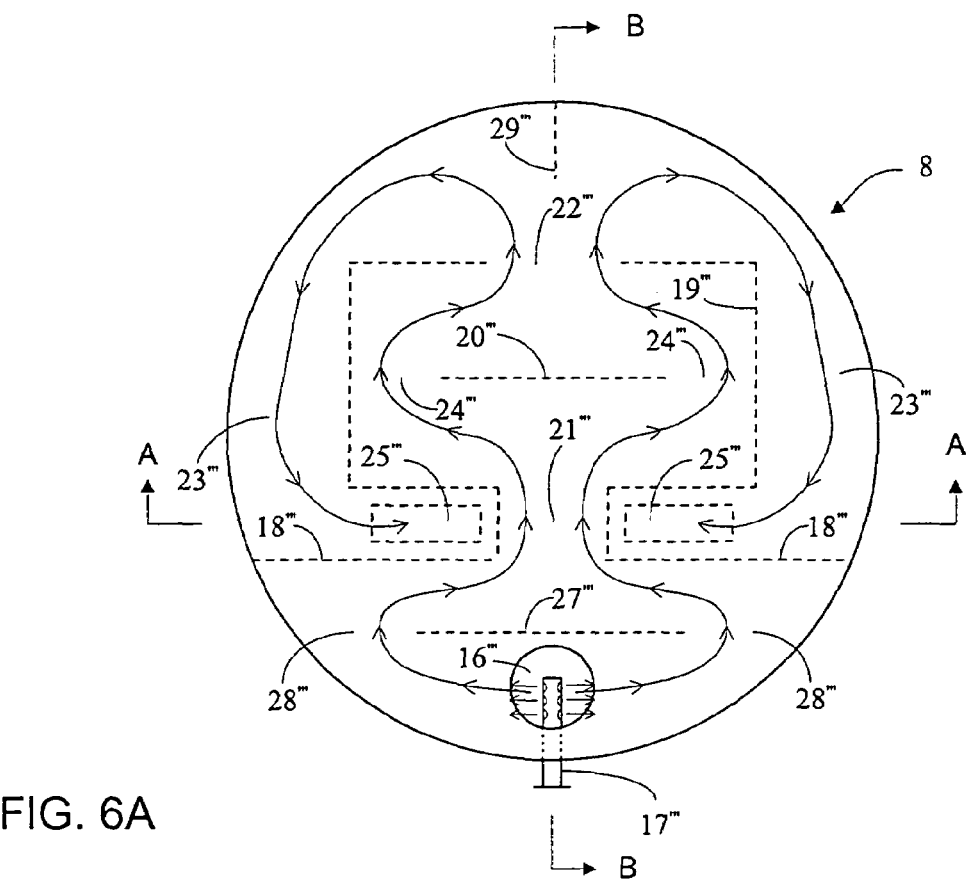
Figure 6B:
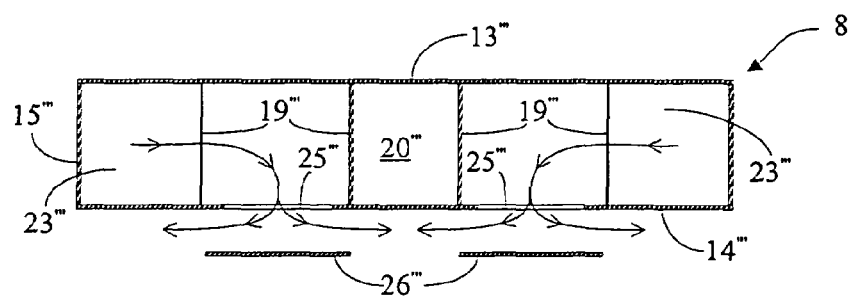
Figure 6C:
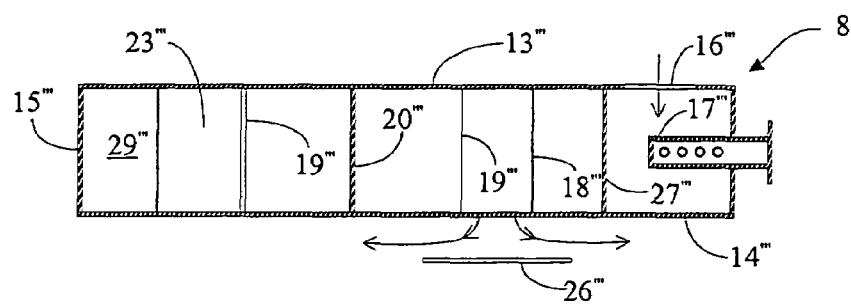

As stated previously any number, location and shape of the outlet opening leading the fluids from inside the mixing box 8 to the space between the mixing box 8 and the distribution tray 11 may be used. FIGS. 6A, 6B, and 6C represent an example of a mixing box 8 with two off-center outlet openings 25'''. The flow path through the mixer is indicated by arrows. FIG. 6A is an overhead view of the mixing box 8. FIG. 6B is a sectional view along line A-A in FIG. 6A. FIG. 6C is a sectional view along line B-B in FIG. 6A. The mixing box comprises a circular top wall 13''', a circular bottom wall 14''' and a cylindrical side wall 15'''. The top wall is provided with one circular opening 16''', which serves as passageway for fluid flow to the mixing box 8 and as a first mixing orifice. Quench fluid is added downstream from the first mixing orifice 16''' through the perforated quench fluid distributor 17''' located between the top wall 13''' and the bottom wall 14'''. Inside the mixing box, a first flow baffle 27''' is located to divide the stream from the first mixing orifice 16''' into two first flow channels 28'''. Second flow baffles 18''' are located in the mixing box to form a second mixing orifice 21''' where the entire process stream is recombined. A third flow baffle 20''' is located in the mixing box to divide the stream from the second mixing orifice 21''' into two second flow channels 24'''. A fourth flow baffle 19''' is located in the mixing box to form a third mixing orifice 22''' where the streams flowing in channels 24''' are recombined. Note that the flow direction through the third mixing orifice 22''' is the reverse of the flow direction through the mixing orifices 22, 22' and 22" in FIGS. 2, 3A, 4A, and 5A. The entire process stream exiting the third mixing orifice 22''' is divided into two third flow channels 23''' leading to the outlet openings 25'''. An optional divider baffle 29''' may be used to obtain a more uniform split of the liquid to each of the third channels 23''' for improved liquid distribution to the distribution tray 11. The streams exit the mixing box through the two rectangular openings 25'''. Below each outlet opening 25''' an impingement plate 26''' is located.

The mixer of FIGS. 6A, 6B, and 6C has the disadvantage compared to the previous examples that a less optimal distribution or spread of the liquid to the distribution tray 11 may occur. This is because the fluid approaches each outlet opening 25''' only from one side, because the outlet openings are not located in the center of the reactor and because the liquid flow rate through each of the openings 25''' may differ due to an uneven split of the liquid at the exit of the third mixing orifice 22'''.

Figure 7A:
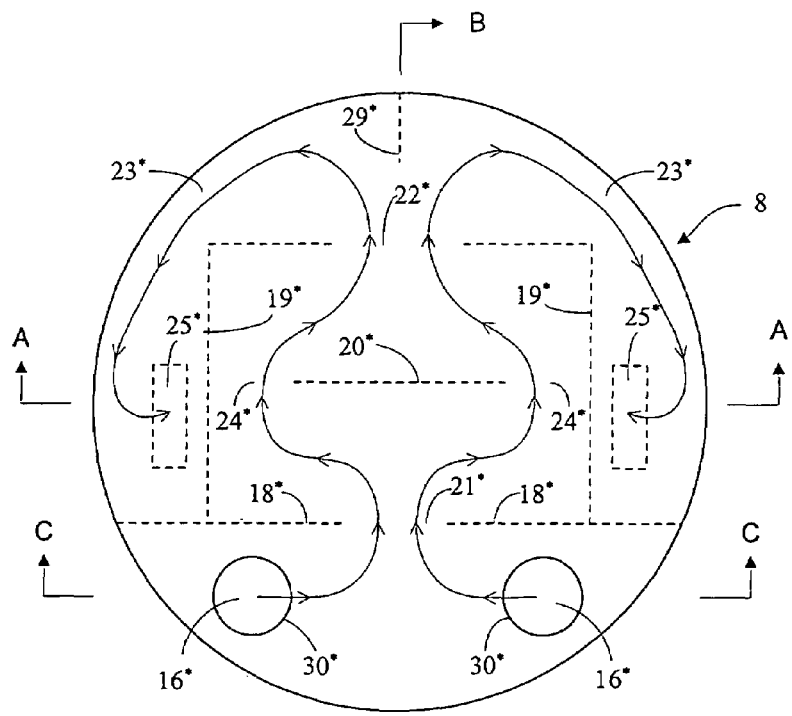
Figure 7B:
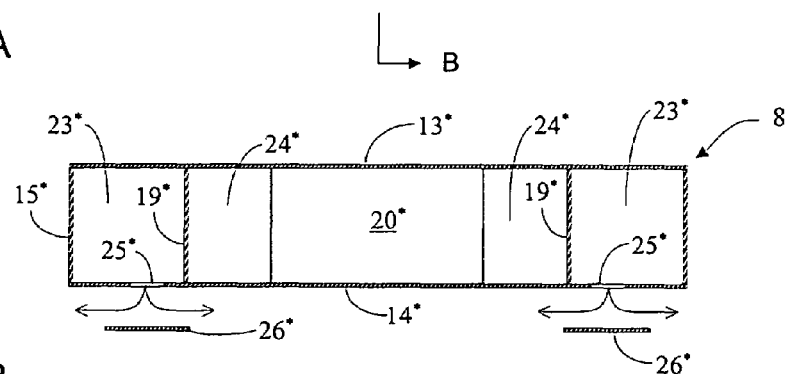
Figure 7C:
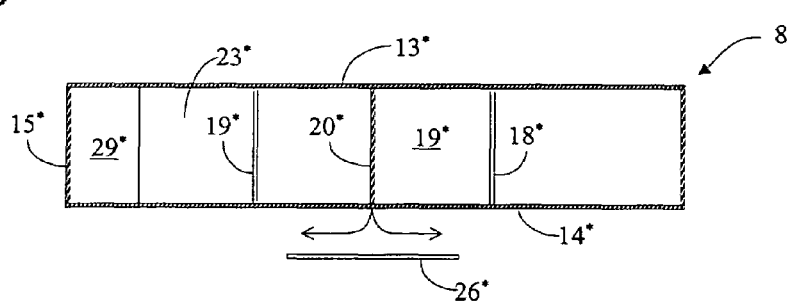
Figure 7D:
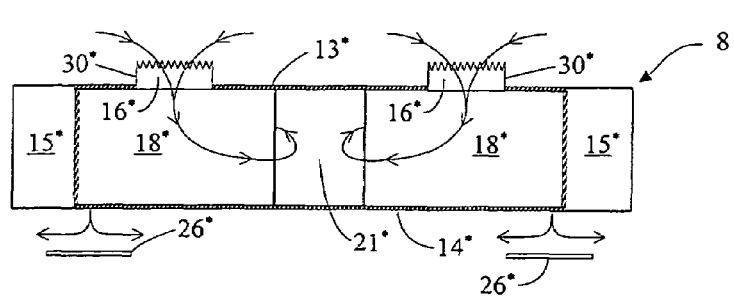
FIG. 7D is a side sectional view taken along the line C-C in FIG. 7A.

As stated above, the mixing device can be constructed with two or more mixing orifices. The larger the number of mixing orifices used, the more vertical height is required for the mixing box for a given total mixer pressure drop. FIGS. 7A, 7B, 7C, and 7D represent an example of a mixing box 8 with two mixing orifices 21* and 22*. FIG. 7A is an overhead view of the mixing box 8. FIG. 7B is a sectional view along line A-A in FIG. 7A. FIG. 7C is a sectional view along line B-B in FIG. 7A. FIG. 7D is a sectional view along line C-C in FIG. 7A. The flow path through the mixer is indicated by arrows. The mixing box comprises a circular top wall 13*, a circular bottom wall 14* and a cylindrical side wall 15*. The top wall 13* is provided with two circular inlet openings 16*, which serve as passageways for vapor and liquid flow into the mixing box 8. A cylindrical conduit 30* which is open in both the upper and lower ends is mounted over or through each of the inlet openings 16* to form an essentially leak-free joint between the top wall 13* and the conduits 30*. The upper rims of the conduits are provided with V-notches. During operation, the top wall 13* will hold a certain liquid level, and due to the V-notches the liquid flow to the inlet openings 16* will be stable in time. Fluctuations in liquid inlet flow rate to the mixer are thus avoided. Also the conduits 30* with V-notches serve for liquid distribution to each inlet opening 16* so that the liquid flow rate to each of the inlet openings will be close to identical. The conduits 30* are shown as cylinders, but they could have any other cross section, such as ellipsoidal, rectangular, triangular, or polygonal. The upper rim of each of the conduits 30* is shown to be provided with V-notches, but other shapes of the openings for liquid flow into the conduits 30* could be used, such as slots or circular holes.

Quench fluid is not added inside the mixing box 8, but it may be added upstream from the circular inlet openings 16*, by conventional means not shown in the drawings. Inside the mixing box two first flow baffles 18* are located to form a first mixing orifice 21* through which the entire process stream flows through. A second flow baffle 20* is located in the mixing box to divide the stream from the first mixing orifice 21* into two first flow channels 24*. A third flow baffle 19* is located in the mixing box to form a second mixing orifice 22* wherein the streams flowing in the first flow channels 24* are recombined. The entire process stream exiting the second mixing orifice 22* is divided into two second flow channels 23* each leading to a rectangular outlet opening 25*. An optional divider baffle 29* may be used to obtain a more uniform split of the liquid to each of the two second flow channels 23* for improved liquid distribution to the distribution tray 11. The streams exit the mixing box through the two rectangular outlet openings 25*. Below each outlet opening 25* an impingement plate 26* is located.

As in the previously-described mixer shown in FIGS. 6A, 6B and 6C, the present mixer may exhibit less than optimal distribution or spread of the liquid to the distribution tray 11. This is because the fluid approaches each outlet opening 25* only from one side, because the outlet openings are not located in the center of the reactor, and because the liquid flow rate through each of the openings 25* may differ due to uneven split of the liquid at the exit of the second mixing orifice 22*. A disadvantage of the present mixer compared to the previous examples is a slightly reduced mixing performance, since there are only two mixing orifices instead of three or more. The mixer also has some advantages: Since the mixer only has two mixing orifices the flow velocity through the mixer can be higher for a given pressure drop than for mixers with three or more mixing orifices. The cross section of the mixing orifices and the flow channels in the mixer can therefore be smaller. Smaller required cross sectional area of the mixing orifices and the flow channels result in a mixer with lower height than mixers designed with three or more mixing orifices. Also the design with the two off-center outlet openings 25* and with identical flow direction through the mixing orifices 21* and 22* helps reducing the mixer height further. The mixer thus represents a very compact design with low height, which may be utilized in small diameter reactors with little room available for the mixing device. For small diameter reactors the liquid distribution or spread to the distribution tray is less critical since the level gradients introduced on the distribution tray 11 in case of poor liquid spread from the mixer is not as significant as for large diameter reactors.

Figure 8A:
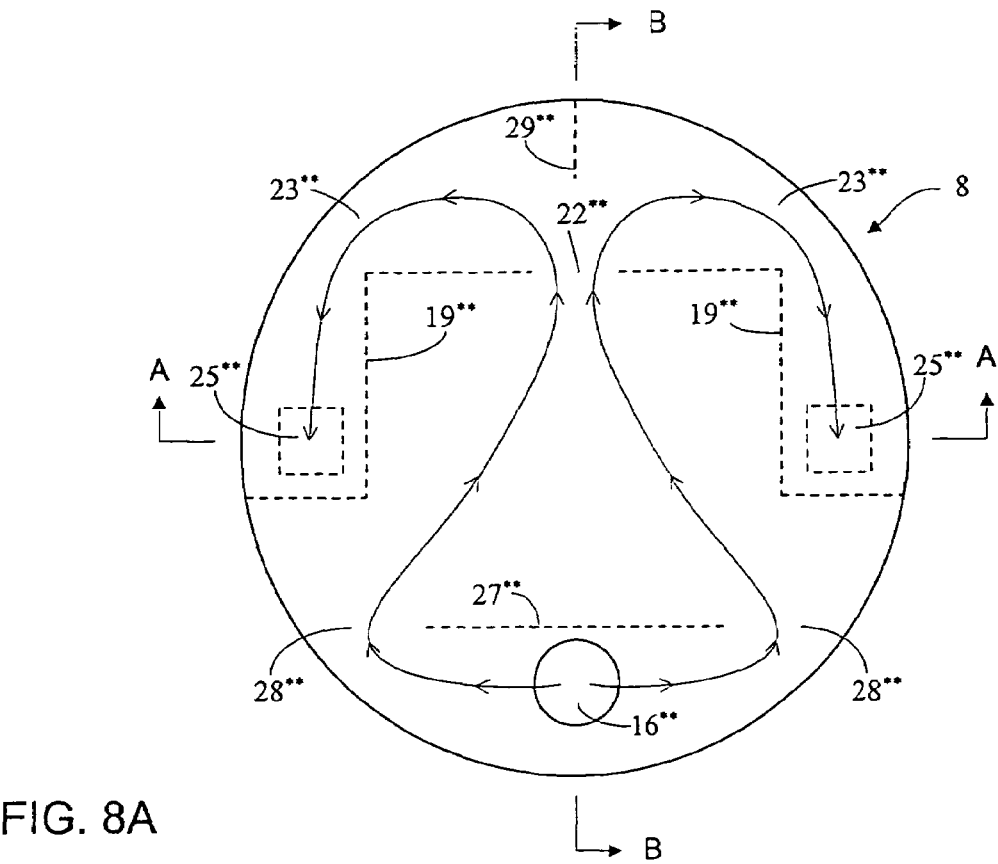
Figure 8B:
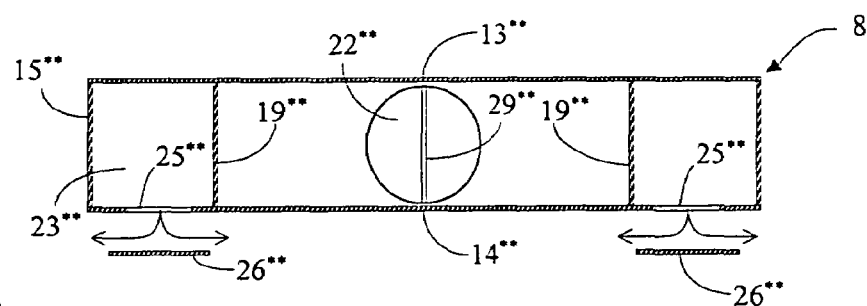
Figure 8C:
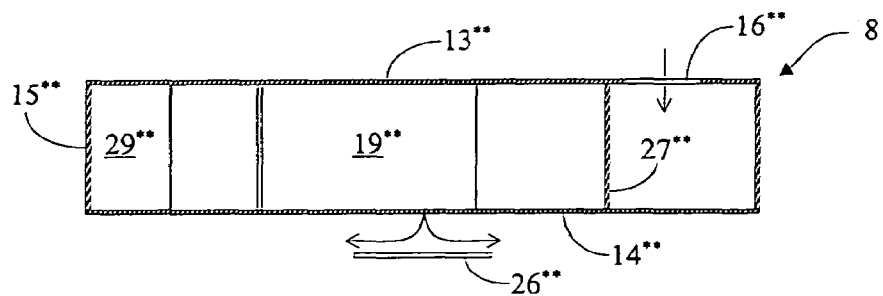

The cross sections of the mixing orifices formed by the flow baffles for the previous examples are all rectangular. Nevertheless, the cross section of the mixing orifices may have any shape as long as the entire process stream is combined in the mixing orifice at high flow velocity. FIGS. 8A, 8B, and 8C represent an example of a mixing box 8 with two mixing orifices 16 and 22** where both mixing orifices have a circular cross section. FIG. 8A is an overhead view of the mixing box 8. FIG. 8B is a sectional view along line A-A in FIG. 8A. FIG. 8C is a sectional view along line B-B in FIG. 8A. The flow path through the mixer is indicated by arrows. The mixing box comprises a circular top wall 13**, a circular bottom wall 14** and a cylindrical side wall 15**. The top wall 13** is provided with one circular inlet opening 16**, which serves as the first mixing orifice and as a passageway for fluid flow into the mixing box 8. Quench fluid is not added inside the mixing box 8, but it may be added upstream the circular inlet opening 16** by conventional means (not shown). Inside the mixing box, a first flow baffle 27** is located to divide the stream from the first mixing orifice 16** into two first flow channels 28**. Another (second) flow baffle 19** is located in the mixing box to form a second mixing orifice 22** wherein the two streams flowing in the first flow channels 28** are recombined. The entire process stream exiting the second mixing orifice 22** is divided into two second flow channels 23** each leading to a square outlet opening 25**. An optional divider baffle 29** may be used to obtain a more uniform split of the liquid to each of the two second flow channels 23** for improved liquid distribution to the distribution tray 11. The streams exit the mixing box through the two rectangular outlet openings 25**. Below each outlet opening 25** an impingement plate 26**** is located.

As in the previous mixer shown in FIGS. 7A, 7B, 7C, and 7D, the present mixer may exhibit less than optimal distribution or spread of the liquid to the distribution tray 11, and slightly reduced mixing performance compared to the mixer designs with three or more mixing orifices. However, as in the last-described mixer, the present mixer represents a very compact design with low height, which may be utilized in small diameter reactors with little room available for the mixing device.

Figure 9A:
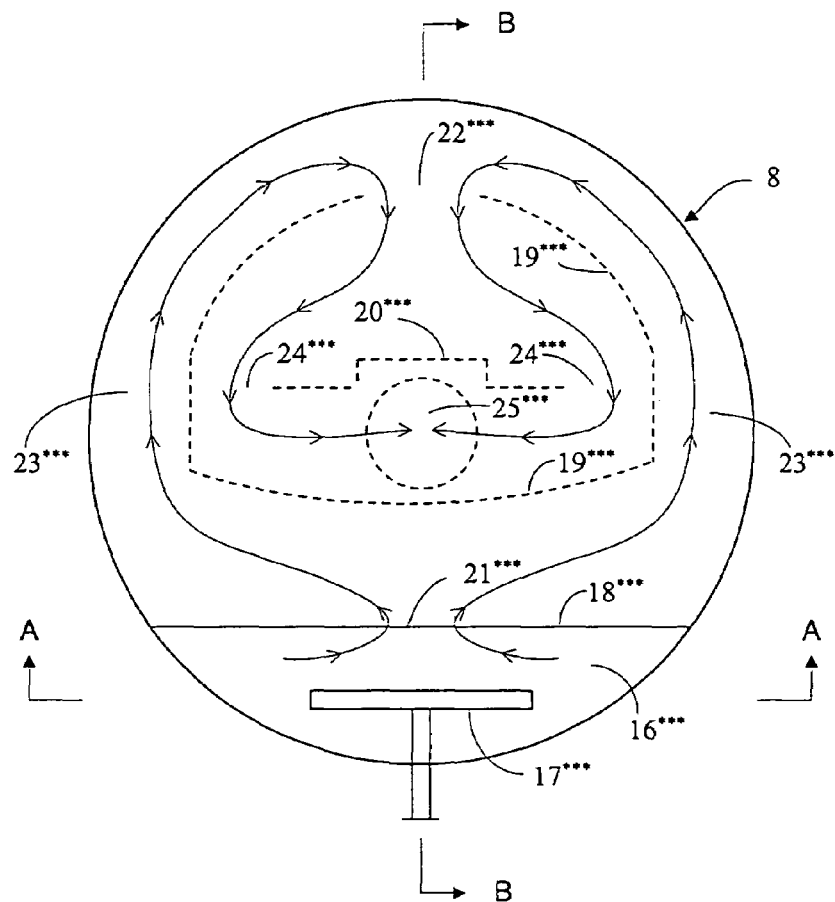
Figure 9B:
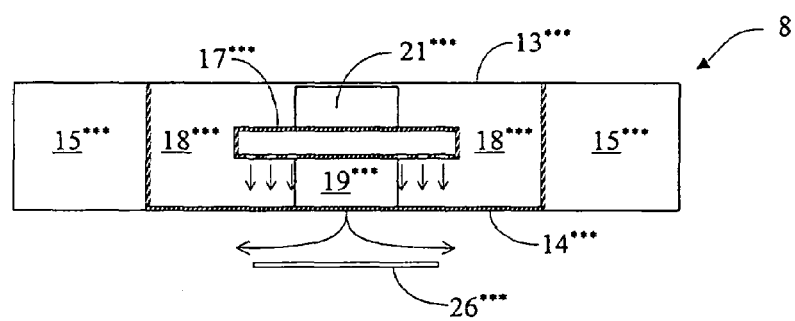
Figure 9C:
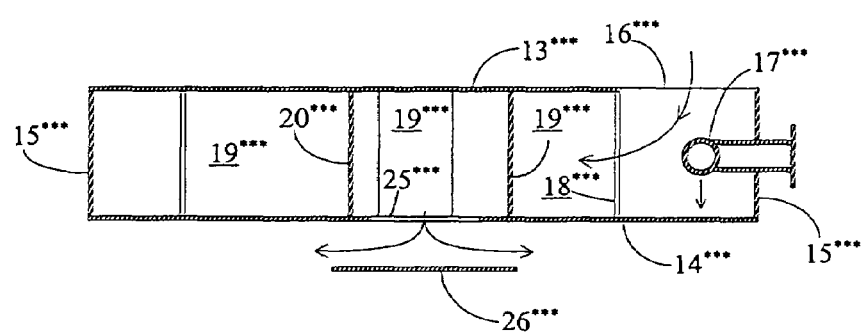

FIGS. 9A, 9B, and 9C represent an example of a mixing box with three mixing orifices similar to the mixers in FIGS. 2, 3A, 3B, and 3C. However the inlet opening 16*, the flow baffles 19*** and 20*** and the quench distributor 17*** have been modified. The flow path through the mixer is indicated by arrows. FIG. 9A is an overhead view of mixing box 8. FIG. 9B is a sectional view along line A-A in FIG. 9A. FIG. 9C is a sectional view along line B-B in FIG. 9A. The mixing box consist of a circular top wall 13***, a circular bottom wall 14*** and a cylindrical side wall 15***. The top wall is provided with a segmental cut-away that forms the inlet opening 16*** for fluid entrance to the mixing box 8. Quench fluid is added downstream from the inlet opening 16*** through a quench fluid distributor 17*** located between the top and bottom plates 13*** and 14***. The quench fluid distributor can be of different types, and the quench fluid exit direction from the distributor can be any desired direction. In this case a perforated "Tee" distributor with the fluid jets pointing downward is shown. Inside the mixing box, two first flow baffles 18*** are located forming a first mixing orifice 21*** through which the entire process stream flows at high flow velocity. A curved second flow baffle 19* is located in the mixing box to first divide the stream from the first mixing orifice 21* into two first flow channels 23* and later to recombine the two streams into one stream in a second mixing orifice 22*. Downstream from the second mixing orifice 22* a stepped flow baffle 20* is located. A third flow baffle 20* divides the stream from the second mixing orifice 22* into two second flow channels 24* before the entire stream is recombined in a third and last circular mixing orifice and outlet opening 25*. Below the outlet opening 25* an impingement plate 26 is located.

Now again referring to FIG. 1, for all embodiments of the mixing device, the mixing box 8 is preferably oriented so that the flow direction through the mixing orifice with horizontal flow, such as mixing orifice 21 of FIG. 2, is parallel to any support beams 7 extending below the surface of the catalyst screen or support grid 6. This is in order to minimize the pressure drop for fluid flow from the outlet of the upper catalyst bed 2 to the inlet opening 16 of the mixing box 8. Any significant pressure drop in this area is unwanted since it will result in an uneven flow pattern through the catalyst bed 2.

Figure 10A:
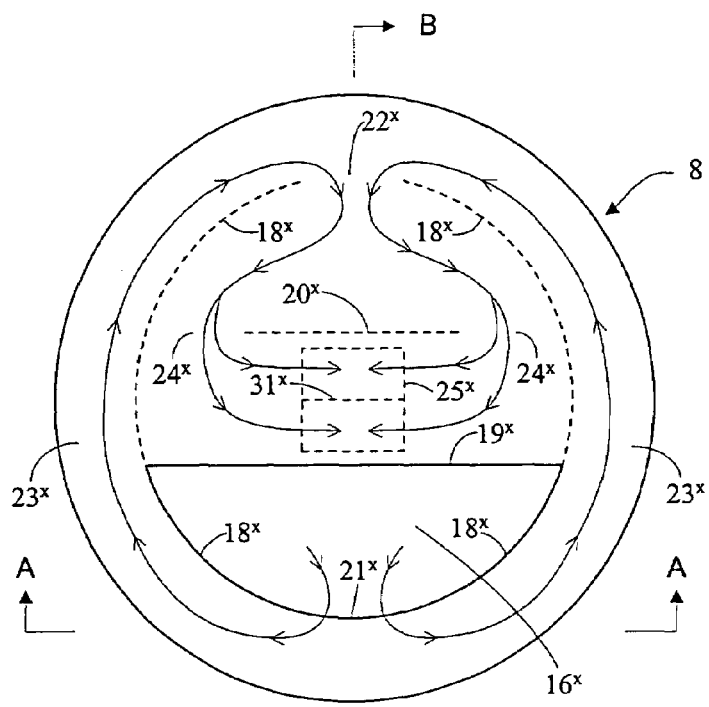
Figure 10B:
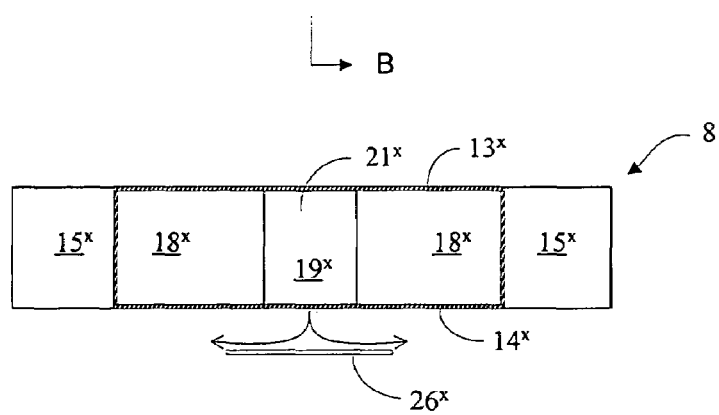
Figure 10C:
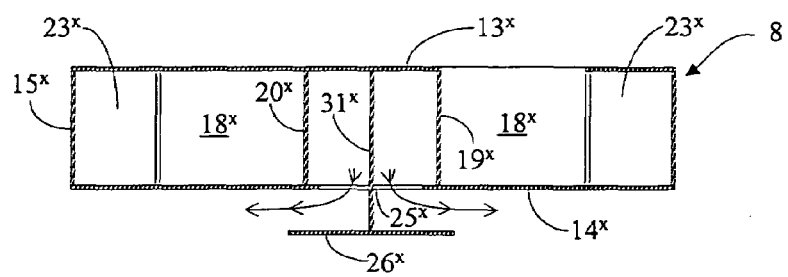

The inlet opening(s) 16 of the previous mixer examples are all located close to the side wall of the mixer 8. This location of the inlet openings tends to increase the above mentioned pressure drop for vapor and liquid flowing from the outlet of the upstream catalyst bed 2 to the inlet opening(s) 16 of the mixer. In order to reduce this pressure drop, the inlet opening(s) may be located closer to the reactor centerline. FIGS. 10A, 10B and 10C represent an example of a mixing box 8 with a segmental inlet opening 16$^x$ located closer to the center of the mixer and closer to the center of the reactor. FIG. 10A is an overhead view of the mixing box 8. FIG. 10B is a sectional view along line A-A in FIG. 10A. FIG. 10C is a sectional view along line B-B in FIG. 10A. The flow path through the mixer is indicated by arrows. The mixer has two mixing orifices. The mixing box comprises a circular top wall 13$^x$, a circular bottom wall 14$^x$ and a cylindrical side wall 15$^x$. The top wall 13$^x$ is provided with the segmental inlet opening 16$^x$ which serves as a passageway for fluid flow into the mixing box 8. Quench fluid is not added inside the mixing box 8, but it may be added upstream from the segmental inlet opening 16$^x$, by conventional means (not shown). Inside the mixing box two semicircular first flow baffles 18$^x$ are located to form a first mixing orifice 21$^x$ and a second mixing orifice 22$^x$. The entire process stream flowing through the inlet opening 16$^x$ enters the first mixing orifice 21$^x$. The process stream exiting the first mixing orifice 21** is divided into two first flow channels 23$^x$. In the first flow channels 23$^x$ the vapor and liquid flow along the cylindrical side wall 15$^x$ to the second mixing orifice 22$^x$ where the entire process stream is recombined at high flow velocity. An optional third flow baffle 20$^x$ may be used to split the stream exiting the second mixing orifice into two lower velocity streams before the fluids exit the mixer through a square outlet opening 25$^x$. To achieve a more compact design with lower height of the mixer 8 the third flow baffle 20$^x$ may be eliminated and an optional outlet flow baffle 31$^x$ located in the outlet opening 25$^x$ may be used instead. The function of the outlet flow baffle 31$^x$ is to prevent the high velocity stream exiting the second mixing orifice from "shooting" toward one side of the reactor only as the stream is passing through the outlet opening 25$^x$. The result would be poor liquid spread to the distribution tray below. The outlet opening 25$^x$ and the inlet opening 16$^x$ are not considered as mixing orifices since the flow velocity through these openings is fairly low. Below the outlet opening 25$^x$ an impingement plate 26$^x$ is located.

Now again referring to FIG. 1, the catalyst support system comprises the catalyst screen 6 and the support beams 7. The catalyst support system and the mixing device 8 are shown to be separate structures in FIG. 1. However, the mixing device of the present invention may be build as an integral part of the catalyst support system.

The mixing box itself may require support beams or other structures to absorb the forces caused by the pressure drop across the mixing box. These support beams or structures are not shown in any of the figures, but they may be located above or below the mixing box or may be an integral part of the mixing box and flow baffles.

For any of the embodiments of the present invention, low capacity drain holes may be provided. The plates, which make up the mixer, may be in one piece or assembled from several plate sections. Normally several removable sections will be provided in the mixer for easy access during inspection and cleaning procedures and to provide a personnel access passage through the mixing box.

The two phase no-slip flow velocity in a flow channel or opening is defined as the flow velocity in the case where there is no slip between the liquid and vapor phases, meaning that the velocity of the liquid phase is identical to the velocity of the vapor phase. The no-slip velocity is therefore:

$$\text{No-Slip velocity} = \frac{Q_l + Q_v}{A},$$

where $Q_l$ is the volumetric liquid flow rate through the channel or opening, $Q_v$ is the volumetric vapor flow rate through the channel or opening, and A is the cross-sectional area of the channel or opening.

The mixing box 8 is typically close to horizontal, meaning that the overall slope of the mixing box from one side of the reactor 1 to another is small. The diameter of the mixing box 8 is typically between about 50% and 100% of the inner diameter of the reactor. The cross-sectional area of each mixing orifice is selected to obtain a no-slip flow velocity of typically 3-15 m/s. The cross-sectional area of the channels with divided flow downstream from a mixing orifice is selected to obtain a maximum no-slip flow velocity of typically 0.25 to 1.00 times the flow velocity in the corresponding mixing orifice. The height of the mixer from top plate to impingement plate may vary from about 100 mm for small diameter reactors to more than 500 mm for large diameter reactors. The horizontal width of the flow baffles 20 and 27 is typically between 1 and 3 times the maximum width of the upstream mixing orifice.

Examples of mixer designs for three different commercial applications are given in table 1. All three examples in table 1 represent the mixer design from FIGS. 2, 3A, 3B, and 3C.

TABLE 1

Examples of mixer designs

|  | Example 1 | Example 2 | Example 3 |
|---|---|---|---|
| Reactor type | Hydrocracker | Hydrotreater | Hydrotreater |
| Reactor inner diameter, mm | 5000 | 3300 | 1600 |
| Liquid flow and properties |  |  |  |
| Actual volumetric flow to mixer, m³/h | 630 | 170 | 32 |

TABLE 1-continued

Examples of mixer designs

| | Example 1 | Example 2 | Example 3 |
|---|---|---|---|
| Density, kg/m³ | 460 | 620 | 500 |
| Viscosity, cP | 0.15 | 0.13 | 0.10 |
| Surface tension, dynes/cm | 7.5 | 4.9 | 2.4 |
| Vapor flow and properties Including Quench fluid | | | |
| Actual volumetric flow to mixer, m³/h | 6200 | 2300 | 420 |
| Density, kg/m³ | 18.5 | 21.9 | 53 |
| Viscosity, cP | 0.021 | 0.022 | 0.019 |
| No-slip two-phase flow velocities in mixing orifices, m/s | 8.1 | 7.8 | 6.8 |

In general terms the following may be noted as regards the invention:

In one aspect it relates to a mixing device for admixing vapor and liquid flowing concurrently inside a vertical vessel in which the vapor and liquid are obstructed by an essential horizontal mixing box which forces the vapor and liquid to pass through a plurality of mixing sequences in series; where one mixing sequence is defined as one mixing orifice followed by one tee; where a mixing orifice is defined as one opening where the combined process stream is flowing through at high velocity and a tee is defined as a stream split from one mixing orifice with high flow velocity into two flow channels with lower flow velocity.

In this mixing device the "essential horizontal" mixing box is defined as a mixing box where the overall slope of the mixing box from one side of the vessel to another side is less than 20%, corresponding to an angle between the horizontal plane and the mixing box of a maximum of 11.5 degrees. Separate segments of the mixing box can have higher slopes as long as the overall slope from one side of the vessel to another side of the vessel is less than the 20% corresponding to 11.5 degrees.

Furthermore, the cross-sectional area of the essentially horizontal mixing box in the plane perpendicular to the vessel walls is between 25% and 100% of the inner cross-sectional area of the vessel. In the cases where the cross-sectional area of the mixing box is less than 100% of the reactor cross-sectional area, the area between the mixing box and the vessel wall is sealed by a plate or other means to obtain an essentially fluid-tight joint between the mixing box and the vessel walls.

A cold quench fluid may be added through a pipe or distributor upstream from the first mixing orifice or between two mixing orifices to cool down the process stream.

The mixing box comprises at least two mixing orifices.

The no-slip two-phase flow velocity in the mixing orifice is between 3 m/s and 15 m/s.

The maximum no-slip two-phase flow velocity in the channels with divided flow downstream from a tee is above 25% of the no-slip two-phase flow velocity in the upstream mixing orifice with combined flow.

The minimum no-slip two-phase flow velocity in the channels with divided flow downstream from a tee is below 100% of the no-slip two-phase flow velocity in the upstream mixing orifice with combined flow.

The reactor vessel could be a vertical hydroprocessing reactor with downward concurrent flow of vapor and liquid in which hydrocarbons are reacted with hydrogen-rich gas in the presence of a hydroprocessing catalyst.

The invention has been described and explained in connection with various embodiments thereof. Nevertheless, numerous variations and modification are conceivable without departing from the invention as defined by the scope of the appended patent claims.

Thus, for instance, one of the mixing orifices or passages may be subdivided into two or more adjacent orifices or passages with common walls. Nevertheless, it is currently believed that the best results, both as regards mixing performance as well as anti-fouling properties, are achieved with each mixing orifice or passage not being subdivided in any way.

Turbulence-creating means, such as for instance vanes, baffles, grids and the like, may be provided upstream from or in the mixing orifices or passages.

The invention claimed is:

1. A mixing device for use in a reactor vessel of a catalytic reactor and arranged in the reactor vessel between an upper catalyst bed and a lower catalyst bed for admixing vapor and liquid flowing concurrently inside the reactor vessel through the catalyst beds, the mixing device comprising:

a substantially horizontal flow path defined between an inlet and an outlet;

a flow dividing structure disposed in the flow path so as to divide a combined flow of vapor and liquid through the flow path into first and second two-phase flow streams of vapor and liquid; and at least first and second mixing orifices, the first mixing orifice disposed in the flow path upstream from the flow dividing structure, and the second mixing orifice disposed in the flow path downstream from the flow dividing structure so as to recombine the first and second flow streams, the first and second mixing orifices being arranged and configured so that substantially the entire combined flow of liquid and vapor is constrained to flow through each of the first and second mixing orifices, wherein each of the first and second mixing orifices has a flow-through area relative to the flow rate of the combined flow such that the no-slip two-phase flow velocity of the combined flow in each of the first and second mixing orifices during at least one operational phase of the reactor is sufficient for the liquid to be dispersed into the vapor and/or the vapor to be dispersed into the liquid.

2. A mixing device according to claim 1, wherein said no-slip two-phase flow velocity of said combined flow in each of the mixing orifices is between 3.0 m/s and 15 m/s during at least one operational phase of said reactor.

3. A mixing device according to claim 2, wherein said no-slip two-phase flow velocity in at least one mixing orifice, during at least one operational phase of said reactor, is between 4.0 m/s and 12.5 m/s.

4. A mixing device according to claim 1, wherein said no-slip two-phase flow velocity in at least one mixing orifice, during at least one operational phase of said reactor is between 3.5 m/s and 10.5 m/s.

5. A mixing device according to claim 1, where the mixing device has an overall slope from one side thereof to the other side thereof of less than 20%, corresponding to an angle with the horizontal plane of maximum 11.5 degrees.

6. A mixing device according to claim 1, wherein said flow path downstream from at least one of the first and second mixing orifices comprises an expanded area flow path section having such a cross-sectional area that the no-slip two-phase flow velocity in said expanded area flow path is substantially lower than the no-slip two-phase flow velocity through said at least one of the mixing orifices such that increased hold time of said flow in said expanded area flow path section is provided for effecting heat and mass transfer.

7. A mixing device according to claim 6, wherein said expanded area flow path section comprises first and second flow channels for the first and second flow streams, respectively, said flow channels having a combined cross-sectional area such that the no-slip two-phase flow velocity of each of the two-phase flow streams is substantially lower than the no-slip two-phase flow velocity through the corresponding mixing orifice, such that increased hold time in said channels is provided for effecting heat and mass transfer.

8. A mixing device according to claim 7, wherein the first and second two-phase streams are of substantially the same size.

9. A mixing device according to claim 6 wherein the total cross-sectional area of said expanded area flow path section of said channels is such that the maximum no-slip two-phase flow velocity is more than approximately 25% of the no-slip two-phase flow velocity in said at least one of the mixing orifices with combined flow.

10. A mixing device according to claim 6, wherein the total cross-sectional area of said expanded area flow path section is such that the minimum no-slip two-phase flow velocity is less than approximately 100% of the no slip two-phase flow velocity in said at least one of the mixing orifices with combined flow.

11. A mixing device according to claim 1, wherein said catalytic reactor is a vertical hydroprocessing reactor with a downward concurrent flow of vapor and liquid in which hydrocarbons are reacted with hydrogen-rich gas in the presence of a hydroprocessing catalyst.

12. A catalytic reactor having an upper catalyst bed superimposed on a lower catalyst bed and provided with a mixing device according to claim 1.

13. A reactor according to claim 12, wherein flow means are provided for causing a cold quench fluid to flow into the reactor vessel at a point upstream from the first mixing orifice.

14. A reactor according to claim 12, wherein flow means are provided for causing a cold quench fluid to flow into the reactor vessel at a point between the first and second mixing orifices.

15. A mixing device according to claim 1, wherein the first mixing orifice is provided by the inlet.

16. A mixing device according to claim 1, wherein the second mixing orifice is provided by the outlet.

17. A mixing device for use in a reactor vessel of a catalytic reactor and arranged in the reactor vessel between an upper catalyst bed and a lower catalyst bed for admixing vapor and liquid flowing concurrently inside the reactor vessel through the catalyst beds, the mixing device comprising:
a top wall having a periphery and provided with at least one inlet;
a bottom wall having a periphery and provided with at least one outlet;
a substantially horizontal flow path defined between the inlet and outlet;
a lateral wall extending between he periphery of the top wall and the periphery of the bottom wall and defining an enclosed space between the top and bottom walls; and
interior baffles extending between the top and bottom walls and configured to define the flow path together with the top, bottom and lateral walls, the baffles being further configured and located between the inlet and the outlet so as to define first and second mixing orifices arranged sequentially along the flow path the first and second mixing orifices being located and configured so as to constrain substantially the entire combined flow of liquid and vapor to flow through each of the mixing orifices, wherein each of the first and second mixing orifices has a flow-through area relative to the flow rate of the combined flow such that the no-slip two-phase flow velocity of the combined flow in each of the mixing orifices during at least one operational phase of the reactor is sufficient for the liquid to be dispersed into the vapor and/or the vapor to be dispersed into the liquid.

18. A mixing device according to claim 17, wherein the mixing device has an overall slope from at least a majority of first points on the periphery of one of said top and bottom walls to the respective points on said periphery of said one of the top and bottom walls, respectively, most remote from the respective first points, that is less than 20%, corresponding to an angle with the horizontal plane of maximum 11.5 degrees.

19. A catalytic reactor having an upper catalyst bed superimposed on a lower catalyst bed and provided with a mixing device according to claim 18.

20. A reactor according to claim 19, wherein said top and bottom walls are essentially planar and preferably mutually parallel and also essentially horizontal.

21. A reactor according to claim 19, wherein a lateral wall extending from the periphery of said top wall to the periphery of said bottom wall conforms in shape and size to the inner surface of the exterior wall of said reactor vessel.

22. A reactor according to claim 19, wherein said lateral wall is constituted by the exterior wall of said reactor vessel.

23. A reactor according to claim 19, further comprising means for obstructing or sealing any space between said lateral wall and the exterior wall of said reactor vessel to obtain an essentially fluid-tight joint between the mixing device and said reactor vessel wall such that the entire flow of vapor and liquid is constrained to flow through said mixing device.

24. A reactor according to claim 19, wherein the cross-sectional area of the essentially horizontal mixing device in the plane perpendicular to the reactor vessel wall is between 25% and 100% of the inner cross sectional area of said reactor vessel.

25. A mixing device according to claim 17, wherein said top and bottom walls are essentially planar and mutually parallel and also essentially horizontal.

26. A mixing device according to claim 17, wherein said no-slip two-phase flow velocity of said combined flow in the mixing orifices is between 3.0 m/s and 15 m/s during at least one operational phase of said reactor.

27. A mixing device according to claim 17, wherein said no-slip two-phase flow velocity in at least one of the mixing orifices, during at least one operational phase of said reactor, is between 4.0 m/s and 12.5 m/s.

28. A mixing device according to claim 17 and comprising two sequentially arranged second mixing orifices, wherein said no-slip two-phase flow velocity in at least one of the mixing orifices, during at least one operational phase of said reactor, is between 3.5 m/s and 10.5 m/s.

29. A mixing device according to claim 17, wherein said baffle baffles are configured such that said flow path downstream of at least one of the first and second mixing orifices comprises an expanded area flow path section having a cross-sectional area such that the no-slip two-phase flow velocity in said expanded area flow path section is substantially lower than the no-slip two-phase flow velocity through said at least one of the mixing orifices such that increased hold time of said flow in said expanded area flow path section is provided for effecting heat and mass transfer.

30. A mixing device according to claim 29, wherein said expanded area flow path section comprises at least two flow channels for dividing said entire combined flow into at least two separate two-phase streams, said at least two channels having such a combined cross-sectional area that the no-slip two-phase flow velocity of each of the at least two separate two-phase streams is substantially lower than the no-slip two-phase flow velocity through the corresponding mixing orifice such that increased hold time in said channels is provided for effecting heat and mass transfer.

31. A mixing device according to claim 30, wherein said at least two separate two-phase streams are of substantially equal size.

32. A mixing device according to claim 29, wherein the total cross-sectional area of said expanded area flow path section is such that the maximum no-slip two-phase flow velocity is more than approximately 25% of the no-slip two-phase flow velocity in the said at least one of the mixing orifices with combined flow.

33. A mixing device according to claim 29, wherein the total cross sectional area of said expanded area flow path section is such that the minimum no-slip two-phase flow velocity is less than approximately 100% of the no-slip two-phase flow velocity in the upstream mixing orifice with combined flow.

34. A mixing device according to claim 17, wherein said catalytic reactor is a vertical hydroprocessing reactor with a downward concurrent flow of vapor and liquid in which hydrocarbons are reacted with hydrogen-rich gas in the presence of a hydroprocessing catalyst.

35. A catalytic reactor having an upper catalyst bed superimposed on a lower catalyst bed and provided with a mixing device according to claim 17.

36. A reactor according to claim 35, wherein flow means are provided for causing a cold quench fluid to flow into the reactor vessel at a point upstream from the first mixing orifice.

37. A reactor according to claim 35, wherein flow means ar provided for causing a cold quench fluid to flow into the reactor vessel at a point between the first and second mixing orifices.

38. A mixing device according to claim 17, wherein the first mixing orifice is provided by the inlet.

39. A mixing device according to claim 17, wherein the second mixing orifice is provided by the outlet.

* * * * *

UNITED STATES PATENT AND TRADEMARK OFFICE
CERTIFICATE OF CORRECTION

PATENT NO. : 7,276,215 B2
APPLICATION NO. : 10/705750
DATED : October 2, 2007
INVENTOR(S) : Morten Müller It is certified that error appears in the above-identified patent and that said Letters Patent is hereby corrected as shown below:

On the Title Page, Item (56), under "U.S. Patent Documents", line 3, delete "3,705,016 11/1972 Ludwigsen et al." and insert -- 3,705,016 12/1972 Ludwigsen et al. --, therefor.

In column 16, line 28, delete "18""" and insert -- 18" --, therefor.

In column 22, line 57, in Claim 5, delete "where" and insert -- wherein --, therefor.

In column 23, line 16, in Claim 9, delete "claim 6" and insert -- claim 6, --, therefor.

In column 23, line 60, in Claim 17, delete "he" and insert -- the --, therefor.

In column 24, line 2, in Claim 17, delete "path" and insert -- path, --, therefor.

In column 24, line 15, in Claim 18, delete "slope from" and insert -- slope reckoned from --, therefor.

In column 24, line 26, in Claim 20, before "mutually" delete "preferably".

In column 24, line 63, in Claim 29, before "baffles" delete "baffle".

In column 25, line 22, in Claim 32, before "said" delete "the".

In column 26, line(s) 2–3, in Claim 33, delete "in the upstream mixing orifice with combined flow." and insert -- in said at least one of the mixing orifices with combined flow. --, therefor.

UNITED STATES PATENT AND TRADEMARK OFFICE
CERTIFICATE OF CORRECTION

PATENT NO.        : 7,276,215 B2
APPLICATION NO.   : 10/705750
DATED             : October 2, 2007
INVENTOR(S)       : Morten Müller It is certified that error appears in the above-identified patent and that said Letters Patent is hereby corrected as shown below:

In column 26, line 17, in Claim 37, delete "ar" and insert -- are --, therefor.

Signed and Sealed this

Eighth Day of December, 2009

David J. Kappos
*Director of the United States Patent and Trademark Office*